United States Patent
Gege et al.

(10) Patent No.: US 12,552,756 B2
(45) Date of Patent: Feb. 17, 2026

(54) DEUTERATED AMINOTHIAZOLE COMPOUNDS AS ANTIVIRAL COMPOUNDS

(71) Applicant: Innovative Molecules GMBH, Munich (DE)

(72) Inventors: Christian Gege, Ehingen (DE); Gerald Kleymann, Bad Salzuflen (DE)

(73) Assignee: INNOVATIVE MOLECULES GMBH, Munich (DE)

( * ) Notice: Subject to any disclaimer, the term of this patent is extended or adjusted under 35 U.S.C. 154(b) by 426 days.

(21) Appl. No.: 18/034,099

(22) PCT Filed: Oct. 28, 2021

(86) PCT No.: PCT/EP2021/080023
§ 371 (c)(1),
(2) Date: Apr. 27, 2023

(87) PCT Pub. No.: WO2022/090409
PCT Pub. Date: May 5, 2022

(65) Prior Publication Data
US 2023/0391738 A1    Dec. 7, 2023

(30) Foreign Application Priority Data
Oct. 29, 2020 (EP) .................... 20204545

(51) Int. Cl.
*C07D 277/54* (2006.01)
*A61P 31/22* (2006.01)

(52) U.S. Cl.
CPC ............ *C07D 277/54* (2013.01); *A61P 31/22* (2018.01); *C07B 2200/05* (2013.01)

(58) Field of Classification Search
CPC .............................. C07D 277/54; A61P 31/22
See application file for complete search history.

(56) References Cited

U.S. PATENT DOCUMENTS

| 10,590,094 B2 | 3/2020 | Kleymann et al. |
| 11,278,534 B2 | 3/2022 | Kleymann et al. |
| 2004/0006076 A1 | 1/2004 | Fischer et al. |

OTHER PUBLICATIONS

Atzrodt, et al., C-H Functionalisation for Hydrogen Isotope Exchange, Angewandte Chemie International, vol. 57, (2018) pp. 3022-3047.
Foster, Deuterium Isotope Effects in the Metabolism of Drugs and Xenobiotics: Implications for Drug Design, Advances in Drug Research, vol. 14, (1985) pp. 1-40.
Michelotti, et al., 40 Years of Hydrogen-Deuterium Exchange Adjacent to Heteroatoms: A Survey, Synthesis, vol. 51, (2019) pp. 1319-1328.
Valero, et al., Directed Iridium-Catalyzed Hydrogen Isotope Exchange Reactions of Phenylacetic Acid Esters and Amides, Chemistry A European Journal Communication, vol. 25, (2019) pp. 6517-6522.
Foster, Deuterium isotope effects in studies of drug metabolism, Elsevier Science Publishers B.V., Amsterdam, pp. 524-527.
Gannes, et al., Natural Abundance Variations in Stable Isotopes and their Potential Uses in Animal Physiological Ecology, Comp. Biochem. Physiol, vol. 119A, No. 3, (1998) pp. 725-737.
Pirali, et al., Applications of Deuterium in Medicinal Chemistry, Journal of Medicinal Chemistry, vol. 62, (2019) pp. 5276-5297.

*Primary Examiner* — Shawquia Jackson
(74) *Attorney, Agent, or Firm* — Oliff PLC

(57) ABSTRACT

The invention relates to novel deuterated compounds of Formula (I)

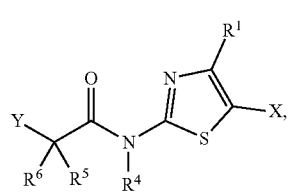

to a process for their preparation and to their use as medicament, in particular as antiviral medicament.

23 Claims, No Drawings

DEUTERATED AMINOTHIAZOLE COMPOUNDS AS ANTIVIRAL COMPOUNDS

CROSS-REFERENCE TO RELATED APPLICATIONS

This application claims priority to International Patent Application Number PCT/EP2021/080023 filed 28 Oct. 2021, published 5 May 2022, and to European Patent Application Number 20204545.6, filed 29 Oct. 2020, both of which are hereby incorporated by reference in their entireties.

SUMMARY OF THE INVENTION

The present invention relates to novel deuterated helicase-primase inhibitors, to a process for their preparation and to their use as medicaments, in particular as antiviral medicaments.

INTRODUCTION

The pandemic of viral infections has plagued humanity since ancient times, causing mucocutaneous infection such as herpes labialis and herpes genitalis. Disease symptoms often interfere with everyday activities and occasionally HSV infections are the cause of life-threatening (encephalitis) or sight-impairing disease (keratitis), especially in neonates, elderly and the immunocompromised patient population such as transplant or cancer patients or patients with an inherited immunodeficiency syndrome or disease. After infection the alpha herpesviridae persist for life in neurons of the host in a latent form, periodically reactivating and often resulting in significant psychosocial distress for the patient. Currently no cure is available.

So far, vaccines, interleukins, interferones, therapeutic proteins, antibodies, immunomodulators and small-molecule drugs with specific or non-specific modes of action lacked either efficacy or the required safety profile to replace the nucleosidic drugs acyclovir, valacyclovir and famciclovir as the first choice of treatment.

The known aminothiazoles (e.g. pritelivir) are the most potent drugs in development today. These antiviral agents act by inhibiting the herpesviral helicase primase, display low resistance rates in vitro and superior efficacy in animal models compared to nucleosidic drugs, however, development is hampered by off target carbonic anhydrase activity and an unusual pharmaco-kinetic profile.

There is a need to develop novel antiviral treatments which target HSV-1 and/or HSV-2. In particular, there is a need to develop antiviral drugs with improved pharmacokinetic properties. The covalent C—H bond is weaker than an otherwise identical C—D bond due to the kinetic isotope effect. The breaking of C—H bonds is a common feature of drug metabolism and breaking of an analogous C—D bond can be more difficult and so decreases the rate of metabolism. Replacement of H with D in small molecules can lead to significant reductions in metabolism leading to beneficial changes in the biological effects of drugs. Replacement may also have the effect of lowering toxicity by reducing the formation of a toxic metabolite (*J. Med. Chem.* 2019;62: 5276). Deuterated analogs share the beneficial mechanism of action, however are expected to be metabolized slower and with less variability between patients compared with the non-deuterated matched pair. It is generally believed that a differentiated pharmacokinetic profile could enable potentially improved efficacy, less frequent dosing, improved tolerability, reduced interpatient variability in drug metabolism and reduced drug-drug interactions.

This patent application discloses new antiviral deuterated aminothiazole compounds with a more suitable pharmacokinetic profile (e.g. due to improved microsomal stability) for use as a medicament.

PRIOR ART

From the prior art aminothiazoles of the general formula (A)

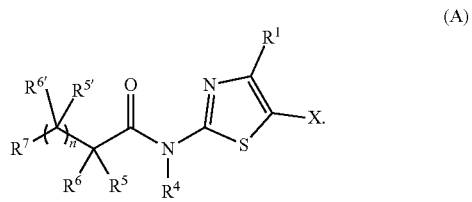

(A)

for the use as antiviral compounds are known.

In particular, WO2001/047904 discloses such aminothiazoles (A), wherein X is a sulfonamide moiety.

WO2017/174640 describes such aminothiazoles of formula (A) wherein X is not a primary sulfonamide but X can be selected from a sulfanimine, sulfinimidamide, sulfoximine or sulfoximidamide.

WO2019/068817 describes enantiomers of the compounds according to WO2017/174640.

WO2020/109389 describes the new use of the aminothiazole compounds according to WO2017/174640 and WO2019/068817 in a combination therapy with oncolytic viruses for treating cancer.

None of these prior art documents refers to any isotopes in general or to deuterium in particular, let alone to a deuterated compound having a structure of the formula (I) as described herein.

Foster A. B. "Deuterium isotope effects in the metabolism of drugs and xenobiotics: implications for drug design"; Advances in Drug Research, Vol. 14, pages 1 to 40, 1985 is a chapter from a book series "Advances in Drug Research" and describes effects of deuterium isotopes on metabolism of drugs and states that substituting deuterium for one or a few hydrogen atoms is a small structural change with negligible sterical consequences. The document further states in the "Conclusion" under Chapter 8, that the scope for using deuterium isotope effects in drug design is very limited and that there are no drugs on the market that contain deuterium in the molecule. The author further concludes that for drugs intended for use in humans additional costs associated with preclinical toxicology and clinical trials will arise, and considers it as very unlikely that the drug regulatory authorities would regard a deuterated drug designed to have biological activity significantly different from that of the parent protium form as other than a new drug.

Deuterated aminothiazole compounds and their use as antiviral medicaments have not been described.

DETAILED DESCRIPTION OF THE INVENTION

The present invention relates to aminothiazole derivatives of the general Formula (I):

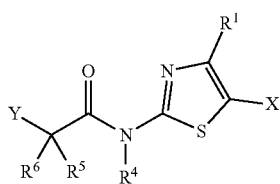
(I)

or an enantiomer, diastereomer, tautomer, solvate, or pharmaceutically acceptable salt thereof, wherein X is selected from

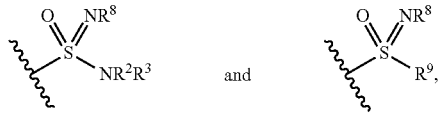

or X is a group

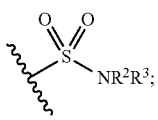

$R^1$ is selected from $C_{1-4}$-alkyl and fluoro-$C_{1-4}$-alkyl, said $C_{1-4}$-alkyl having one or more hydrogen atoms optionally replaced by deuterium;

$R^2$ is selected from H, —CN, $C_{1-4}$-alkyl, fluoro-$C_{1-4}$-alkyl and $C_{1-4}$-acyl, said $C_{1-4}$-alkyl or $C_{1-4}$-acyl having one or more hydrogen atoms optionally replaced by deuterium;

$R^3$ is selected from H and $C_{1-4}$-alkyl and fluoro-$C_{1-4}$-alkyl, said $C_{1-4}$-alkyl having one or more hydrogen atoms optionally replaced by deuterium;

$R^4$ is selected from H and $C_{1-6}$-alkyl, said $C_{1-6}$-alkyl having one or more hydrogen atoms optionally replaced by deuterium;

$R^5$ and $R^6$ are independently selected from H, D (deuterium) and $C_{1-4}$-alkyl, said $C_{1-4}$-alkyl having one or more hydrogen atoms optionally replaced by deuterium;

$R^8$ is selected from H, —CN, —NO$_2$, $C_{1-4}$-alkyl, said $C_{1-4}$-alkyl having one or more hydrogen atoms optionally replaced by deuterium;

$R^9$ is selected from $C_{1-4}$-alkyl, fluoro-$C_{1-4}$-alkyl, $C_{3-4}$-cycloalkyl and fluoro-$C_{3-4}$-cycloalkyl, said $C_{1-4}$--alkyl or $C_{3-4}$-cycloalkyl having one or more hydrogen atoms optionally replaced by deuterium;

Y is a group

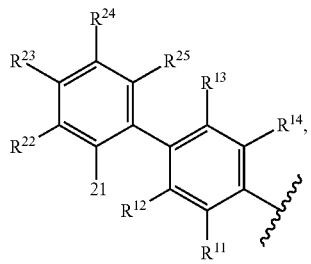

wherein
$R^{11}$, $R^{12}$, $R^{13}$ and $R^{14}$ are independently selected from H, D, halogen, CN, $C_{1-4}$-alkyl and fluoro-$C_{1-4}$-alkyl, said $C_{1-4}$-alkyl having one or more hydrogen atoms optionally replaced by deuterium;

$R^{21}$, $R^{22}$, $R^{23}$, $R^{24}$ and $R^{25}$ are independently selected from H, D, halogen, CN, $C_{1-4}$-alkyl, O—$C_{1-4}$-alkyl, fluoro-$C_{1-4}$-alkyl and O-fluoro-$C_{1-4}$-alkyl, said $C_{1-4}$-alkyl having one or more hydrogen atoms optionally replaced by deuterium;

provided that at least one hydrogen in $R^1$, $R^2$, $R^3$, $R^4$, $R^5$, $R^6$, $R^8$, $R^9$, $R^{11}$, $R^{12}$, $R^{13}$, $R^{14}$, $R^{21}$, $R^{22}$, $R^{23}$, $R^{24}$ or $R^{25}$ is replaced by deuterium.

In the context of the present invention "$C_{1-6}$-alkyl" means a saturated alkyl chain having 1 to 6 carbon atoms which may be straight chained or branched. Examples thereof include methyl, ethyl, propyl, isopropyl, n-butyl, isobutyl, tent-butyl, n-pentyl, isopentyl, neopentyl and hexyl. Accordingly a group "$C_{1-4}$-alkyl" represents a saturated alkyl chain having 1, 2, 3 or 4 carbon atoms which may be straight chained or branched. Preferred is "$C_{1-4}$-alkyl", more preferred is $C_{1-3}$-alkyl, such as methyl, ethyl, propyl and isopropyl, most preferred is methyl.

The term "fluoro-$C_{1-4}$-alkyl", or "fluoro-$C_{3-4}$-cycloalkyl" or "O-fluoro-$C_{1-4}$-alkyl", respectively, means that one or more hydrogen atoms in the alkyl chain or cycle are replaced by one or more fluoro atoms. A preferred example thereof is the formation of a —CF$_3$ group.

A $C_{3-4}$-cycloalkyl group means a cyclopropyl or cyclobutyl group. Preferred is cyclopropyl.

A $C_{1-4}$-acyl group (also named "alkanoyl") means a $C_{1-4}$-alkyl group which contains a double-bonded oxygen atom [R—(C═O)—], wherein R represents H or an $C_1$-$C_3$-alkyl group.

Halogen is selected from fluorine, chlorine, bromine and iodine, preferred are fluorine and chlorine, most preferred is fluorine.

"Deuteration", "deuterium labelled", "deuterium substituted" or "deuterated" in the sense of the present disclosure means that one or more hydrogen atom(s) of the compound of Formula (I) is/are replaced by deuterium ($^2$H, represented by "D").

The compounds of Formula (I) contain from 1 to n deuterium atom(s) replacing 1 to n hydrogen atom(s) attached to a carbon atom, in which n is the number of hydrogen atom(s) in the molecule. It has surprisingly been found, that such deuterated aminothiazole compounds exhibit increased resistance to metabolism and thus be useful for increasing the half-life of a compound of Formula (I), compared to a respective undeuterated compound, when administered to a mammal, e.g. a human. See, for example, Foster in Trends Pharmacol. Sci. 1984:5;524. Such deuterated aminothiazole compounds are synthesized by means well known in the art, for example by employing starting materials in which one or more hydrogens have been replaced by deuterium (see Experimental Section for details).

Deuterium labelled or substituted therapeutic compounds of the disclosure surprisingly turned out to have improved DMPK (drug metabolism and pharmacokinetics) properties, relating to absorption, distribution, metabolism and excretion (ADME). Substitution with deuterium turned out to afford certain therapeutic advantages resulting from greater metabolic stability, for example increased in vivo half-life, reduced dosage requirements and/or an improvement in therapeutic index.

The concentration of deuterium may be defined by an isotopic enrichment factor. In the compounds of this disclosure any atom not specifically designated as a particular isotope is meant to represent any stable or radioactive isotope of that atom. Unless otherwise stated, when a position is designated specifically as "H" or "hydrogen", the position is understood to have hydrogen at its natural abundance isotopic composition (about 99.98% hydrogen). Accordingly, in the compounds of this disclosure any atom specifically designated as a deuterium (D) is meant to represent deuterium with an isotopic purity of at least 50%, preferably an isotopic purity of at least 95%, more preferably an isotopic purity of at least 99%.

The percentage of deuterium incorporation can be obtained by quantitative analysis using a number of conventional methods, such as mass spectroscopy (peak area) or by quantifying the remaining residual $^1$H-NMR signals of the specific deuteration site compared to signals from internal standards or other, non-deuterated $^1$H signals in the compound.

It will be recognized that some variation of natural isotopic abundance occurs in a synthesized compound depending upon the origin of chemical materials used in the synthesis. Thus, a preparation of non-deuterated analogs of compounds of the present invention will inherently contain small amounts of deuterated isotopologues. The concentration of naturally abundant stable hydrogen and carbon isotopes, notwithstanding this variation, is small and immaterial as compared to the degree of stable isotopic substitution of compounds of this invention. See, for instance, *Comp. Biochem. Physiol.* 1998;119A:725.

The term "isotopic enrichment factor" at a particular position normally occupied by hydrogen refers to the ratio between the abundance of deuterium at the position and the natural abundance of deuterium at that position. By way of example, an isotopic enrichment factor of 3500 means that the amount of deuterium at the particular position is 3500-fold the natural abundance of deuterium, or that 52.5% of the compounds have deuterium at the particular position (i.e., 52.5% deuterium incorporation at the given position). The abundance of deuterium in the oceans of Earth is approximately one atom in 6500 hydrogen atoms (about 154 parts per million (ppm)). Deuterium thus accounts for approximately 0.015 percent (on a weight basis, 0.030 percent) of all naturally occurring hydrogen atoms in the oceans on Earth; the abundance changes slightly from one kind of natural water to another.

The deuterated compounds of this disclosure are preferably characterized by an isotopic enrichment factor of at least 6300, or by a deuteration degree of at least 95%. More preferably by an isotopic enrichment factor of at least 6500, or by a deuteration degree of at least 98%.

Any formula or structure given herein, is also intended to represent deuterated compounds comprising in addition further isotopically labeled atoms. Examples of additional isotopes that can be incorporated into compounds of the disclosure include further isotopes of hydrogen, as well as isotopes of carbon, nitrogen, oxygen, phosphorous, fluorine and chlorine, such as, but not limited to $^3$H (tritium), $^{11}$C, $^{13}$C, $^{14}$C, $^{15}$N, $^{18}$F, $^{31}$P, $^{32}$P, $^{35}$S, $^{36}$Cl and $^{125}$I. The disclosure further comprises various isotopically labeled compounds into which radioactive isotopes such as $^3$H, $^{13}$C and $^{14}$C are incorporated. Such isotopically labelled compounds may be useful in metabolic studies, reaction kinetic studies, detection or imaging techniques, such as positron emission tomography (PET) or single-photon emission computed tomography (SPECT) including drug or substrate tissue distribution assays or radioactive treatment of patients. Isotopically labeled compounds of this disclosure and prodrugs thereof can generally be prepared by carrying out the procedures disclosed in the schemes or in the examples and preparations described below by substituting a readily available isotopically labeled reagent for a non-isotopically labeled reagent.

It will be appreciated by the skilled person that when lists of alternative substituents include members which, because of their valency requirements or other reasons, cannot be used to substitute a particular group, the list is intended to be read with the knowledge of the skilled person to include only those members of the list which are suitable for substituting the particular group.

The compounds used in the present invention can be in the form of a pharmaceutically acceptable salt or a solvate. The term "pharmaceutically acceptable salts" refers to salts prepared from pharmaceutically acceptable non-toxic bases or acids, including organic and inorganic bases or acids. In case the compounds of the present invention contain one or more acidic or basic groups, the invention also comprises their corresponding pharmaceutically or toxicologically acceptable salts, in particular their pharmaceutically utilizable salts. Thus, the compounds of the present invention which contain acidic groups can be used according to the invention, for example, as alkali metal salts, alkaline earth metal salts or ammonium salts. More precise examples of such salts include sodium salts, potassium salts, calcium salts, magnesium salts or salts with ammonia or organic amines such as, for example, ethylamine, ethanolamine, triethanolamine or amino acids. The compounds of the present invention which contain one or more basic groups, i.e. groups which can be protonated, can be used according to the invention in the form of their addition salts with inorganic or organic acids. Examples of suitable acids include hydrogen chloride, hydrogen bromide, phosphoric acid, sulfuric acid, nitric acid, methanesulfonic acid, p-toluenesulfonic acid, naphthalenedisulfonic acids, oxalic acid, acetic acid, tartaric acid, lactic acid, salicylic acid, benzoic acid, formic acid, propionic acid, pivalic acid, diethylacetic acid, malonic acid, succinic acid, pimelic acid, fumaric acid, maleic acid, malic acid, sulfaminic acid, phenylpropionic acid, gluconic acid, ascorbic acid, isonicotinic acid, citric acid, adipic acid and other acids known to the person skilled in the art. If the compounds of the present invention simultaneously contain acidic and basic groups in the molecule, the invention also includes, in addition to the salt forms mentioned, inner salts or betaines (zwitterions). The respective salts can be obtained by customary methods which are known to the person skilled in the art like, for example, by contacting these with an organic or inorganic acid or base in a solvent or dispersant, or by anion exchange or cation exchange with other salts. The present invention also includes all salts of the compounds of the present invention which, owing to low physiological compatibility, are not directly suitable for use in pharmaceuticals but which can be used, for example, as intermediates for chemical reactions or for the preparation of pharmaceutically acceptable salts.

Further the compounds of the present disclosure may be present in the form of solvates, such as those which include as solvate water, or pharmaceutically acceptable solvates, such as alcohols, in particular ethanol. A stoichiometric or non-stoichiometric amount of solvent is bound by non-covalent intermolecular forces. When the solvent is water, the "solvate" is a "hydrate." It is understood, that a "pharmaceutically acceptable salt" can in addition optionally contain a "solvate".

Depending on the substitution pattern, the compounds according to the invention can exist in stereoisomeric forms which either behave as image and mirror image (enantiomers), or which do not behave as image and mirror image (diastereomers). The invention relates both to the enantiomers or diastereomers and their respective mixtures. Like the diastereomers, the racemic forms can be separated into the stereoisomerically uniform components in a known manner. The term "diastereomer" means stereoisomers that are not mirror images of one another and are non-superimposable on one another. The term "enantiomer" means each individual optically active form of a compound of the invention, having an optical purity or enantiomeric excess (as determined by methods standard in the art) of at least 80% (i.e. at least 90% of one enantiomer and at most 10% of the other enantiomer), preferably at least 90% and more preferably at least 98%.

The term "effective amount" is meant to include the amount of a compound that, when administered, is sufficient to prevent development of, or alleviate to some extent, one or more of the symptoms of a disorder, disease, or condition being treated. The term "effective amount" also refers to the amount of a compound that is sufficient to elicit the biological or medical response of a cell, tissue, system, animal, or human, which is being sought by a researcher, veterinarian, medical doctor, or clinician.

The scope of the invention includes those compounds which are only converted into the actual active compounds of the Formula (I) once inside the body (so-called prodrugs).

The invention relates in particular to the following embodiments:

In a preferred embodiment in combination with any of the above or below embodiments $R^1$ is selected from $C_{1-4}$-alkyl and fluoro-$C_{1-4}$-alkyl, said $C_{1-4}$-alkyl having one or more hydrogen atoms optionally replaced by deuterium, preferably $R^1$ is selected from $CH_3$ and $CD_3$, and most preferably $R^1$ is $CD_3$.

In a preferred embodiment in combination with any of the above or below embodiments $R^2$ is selected from H, —CN, $C_{1-4}$-alkyl, fluoro-$C_{1-4}$-alkyl and $C_{1-4}$-acyl, said $C_{1-4}$-alkyl or $C_{1-4}$-acyl having one or more hydrogen atoms optionally replaced by deuterium, preferably $R^2$ is selected from H, $CH_3$ and $CD_3$, and most preferably $R^2$ is H.

In a preferred embodiment in combination with any of the above or below embodiments $R^3$ is selected from H and $C_{1-4}$-alkyl and fluoro-$C_{1-4}$-alkyl, said $C_{1-4}$-alkyl having one or more hydrogen atoms optionally replaced by deuterium, and most preferably $R^3$ is H.

In a preferred embodiment in combination with any of the above or below embodiments $R^4$ is selected from H and $C_{1-6}$-alkyl, said $C_{1-6}$-alkyl having one or more hydrogen atoms optionally replaced by deuterium, preferably $R^4$ is selected from $CH_3$ and $CD_3$, and most preferably $R^4$ is $CH_3$.

In a preferred embodiment in combination with any of the above or below embodiments $R^5$ and $R^6$ are independently selected from H, D and $C_{1-4}$-alkyl, said $C_{1-4}$-alkyl having one or more hydrogen atoms optionally replaced by deuterium, preferably $R^5$ and $R^6$ are both H or both D, and most preferably $R^5$ and $R^6$ are both H.

In a preferred embodiment in combination with any of the above or below embodiments $R^8$ is selected from H, —CN, —$NO_2$, $C_{1-4}$-alkyl, said $C_{1-4}$-alkyl having one or more hydrogen atoms optionally replaced by deuterium, and most preferably $R^8$ is H.

In a preferred embodiment in combination with any of the above or below embodiments $R^9$ is selected from $C_{1-4}$-alkyl, fluoro-$C_{1-4}$-alkyl, $C_{3-4}$-cycloalkyl and fluoro-$C_{3-4}$-cycloalkyl, said $C_{1-4}$-alkyl or $C_{3-4}$-cycloalkyl having one or more hydrogen atoms optionally replaced by deuterium, preferably $R^9$ is selected from $CH_3$, $CD_3$ and cyclopropyl, and most preferably $R^9$ is $CH_3$.

A particularly preferred embodiment of the invention relates to compounds of Formula (I) as defined above, wherein $R^1$ is selected from $CH_3$ and $CD_3$;
$R^4$ is $CH_3$;
$R^2$, $R^3$, $R^5$, $R^6$ and $R^8$ are H;
$R^9$ is selected from methyl and cyclopropyl.

In a more preferred embodiment in combination with any of the above or below embodiments Y is the group

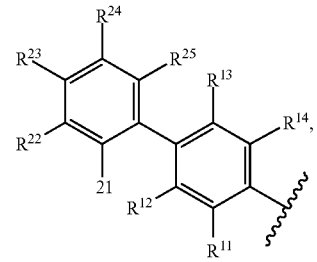

wherein
$R^{11}$ is selected from H, D, halogen, CN, $C_{1-4}$-alkyl and fluoro-$C_{1-4}$-alkyl, said $C_{1-4}$-alkyl having one or more hydrogen atoms optionally replaced by deuterium, preferably $R^{11}$ is selected from H, D and F, more preferably $R^{11}$ is selected from H and F, most preferably $R^{11}$ is H;
$R^{12}$ is selected from H, D, halogen, CN, $C_{1-4}$-alkyl and fluoro-$C_{1-4}$-alkyl, said $C_{1-4}$-alkyl having one or more hydrogen atoms optionally replaced by deuterium, most preferably $R^{12}$ is H;
$R^{13}$ is selected from H, D, halogen, CN, $C_{1-4}$-alkyl and fluoro-$C_{1-4}$-alkyl, said $C_{1-4}$-alkyl having one or more hydrogen atoms optionally replaced by deuterium, most preferably $R^{13}$ is H;
$R^{14}$ is selected from H, D, halogen, CN, $C_{1-4}$-alkyl and fluoro-$C_{1-4}$-alkyl, said $C_{1-4}$-alkyl having one or more hydrogen atoms optionally replaced by deuterium, most preferably $R^{14}$ is H;
$R^{21}$ is selected from H, D, halogen, CN, $C_{1-4}$-alkyl, O—$C_{1-4}$-alkyl, fluoro-$C_{1-4}$-alkyl and O-fluoro-$C_{1-4}$-alkyl, said $C_{1-4}$-alkyl having one or more hydrogen atoms optionally replaced by deuterium, preferably $R^{21}$ is selected from H, D, F and $OCD_3$, more preferably $R^{21}$ is selected from H and F, most preferably $R^{21}$ is F;
$R^{22}$ is selected from H, D, halogen, CN, $C_{1-4}$-alkyl, O—$C_{1-4}$-alkyl, fluoro-$C_{1-4}$-alkyl and O-fluoro-$C_{1-4}$-alkyl, said $C_{1-4}$-alkyl having one or more hydrogen atoms optionally replaced by deuterium, preferably $R^{22}$ is selected from H, D and F, more preferably $R^{22}$ is selected from H and D, most preferably $R^{22}$ is H;

$R^{23}$ is selected from H, D, halogen, CN, $C_{1-4}$-alkyl, O—$C_{1-4}$-alkyl, fluoro-$C_{1-4}$-alkyl and O-fluoro-$C_{1-4}$-alkyl, said $C_{1-4}$-alkyl having one or more hydrogen atoms optionally replaced by deuterium, preferably $R^{23}$ is selected from H, D and F, more preferably $R^{23}$ is selected from H and D, most preferably $R^{23}$ is H;

$R^{24}$ is selected from H, D, halogen, CN, $C_{1-4}$-alkyl, O—$C_{1-4}$-alkyl, fluoro-$C_{1-4}$-alkyl and O-fluoro-$C_{1-4}$-alkyl, said $C_{1-4}$-alkyl having one or more hydrogen atoms optionally replaced by deuterium, preferably $R^{24}$ is selected from H, D, F and $OCD_3$, more preferably $R^{24}$ is selected from H and F, most preferably $R^{24}$ is F;

$R^{25}$ is selected from H, D, halogen, CN, $C_{1-4}$-alkyl, O—$C_{1-4}$-alkyl, fluoro-$C_{1-4}$-alkyl and O-fluoro-$C_{1-4}$-alkyl, said $C_{1-4}$-alkyl having one or more hydrogen atoms optionally replaced by deuterium, preferably $R^{25}$ is selected from H, D and F, more preferably $R^{25}$ is selected from H and D, most preferably $R^{25}$ is H.

In an even more preferred embodiment in combination with any of the above or below embodiments Y is selected from a group consisting of

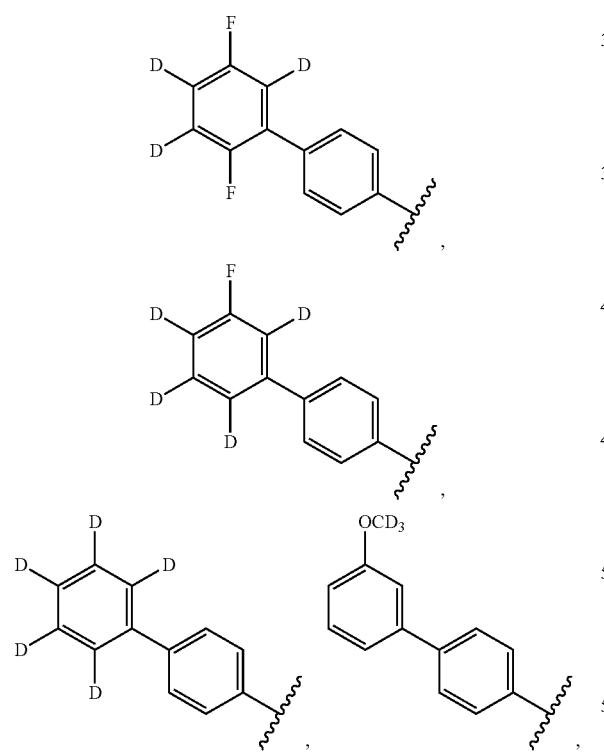

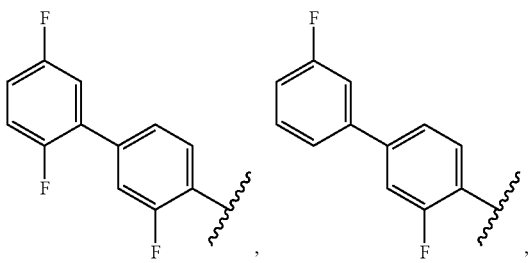

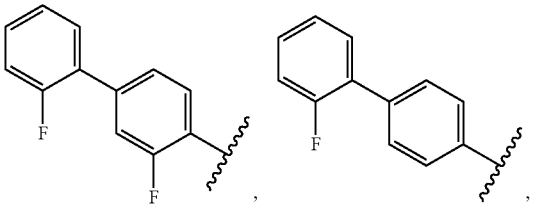

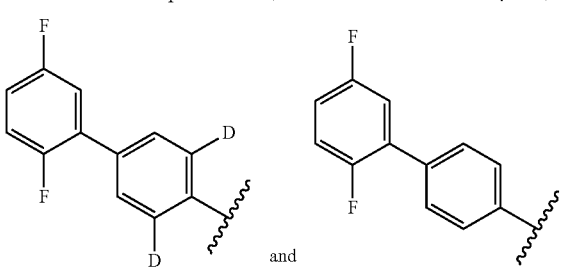

and

, such as preferably from

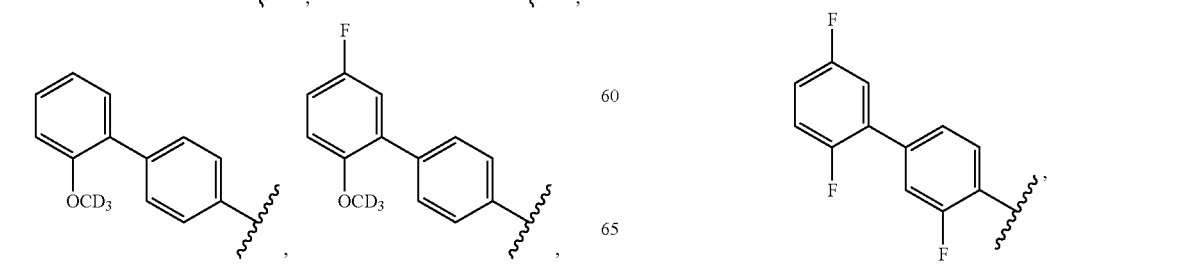

-continued

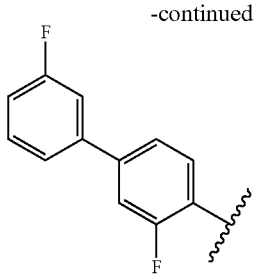

and

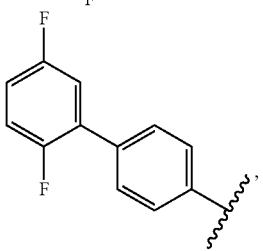

such as more preferably from

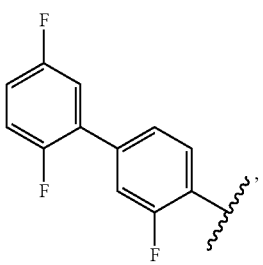

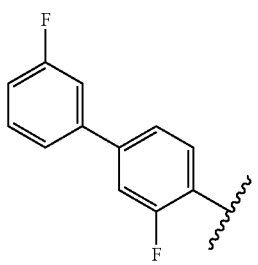

and

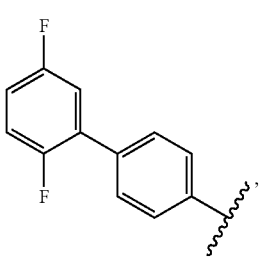 [SMILES: *c1ccc(-c2cc(F)ccc2F)cc1]

such as most preferably

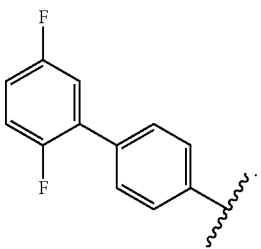

.

In yet another preferred embodiment in combination with any of the above or below embodiments in Formula (I) the group $R^1$ is $CD_3$.

In yet another preferred embodiment in combination with any of the above or below embodiments in Formula (I) the group X is selected from

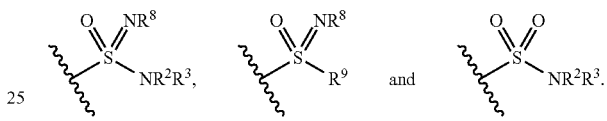

In yet another preferred embodiment in combination with any of the above or below embodiments in Formula (I) the group X is selected from

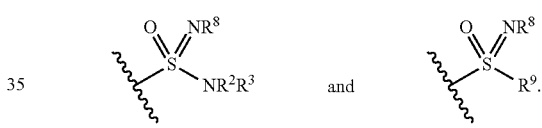

In yet another preferred embodiment in combination with any of the above or below embodiments in Formula (I) the group X is

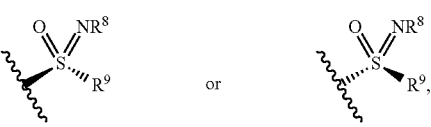

preferably X is

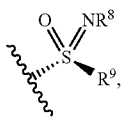

and most preferably X is

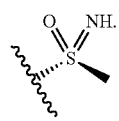

In yet another preferred embodiment in combination with any of the above or below embodiments in Formula (I) the group
X is
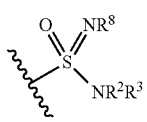
preferably X is
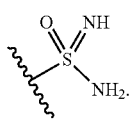
Particularly preferred compounds of the present invention are represented by the following formulas:
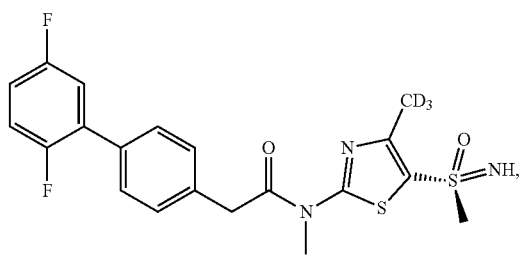
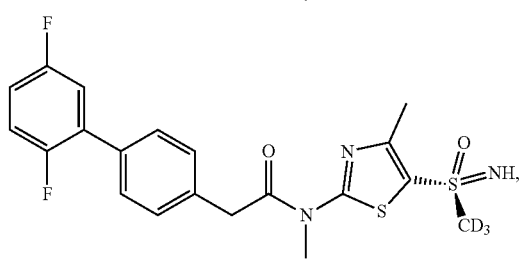
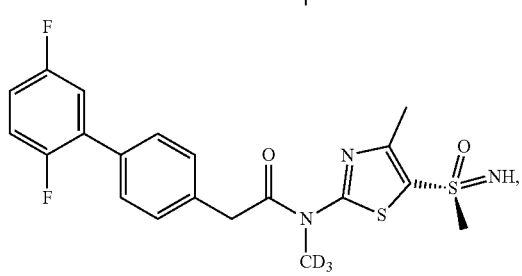
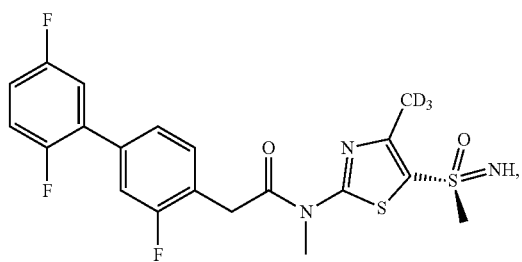
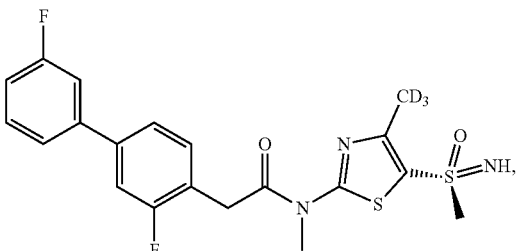
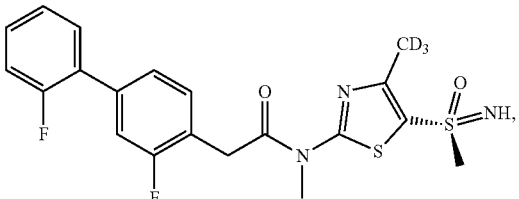
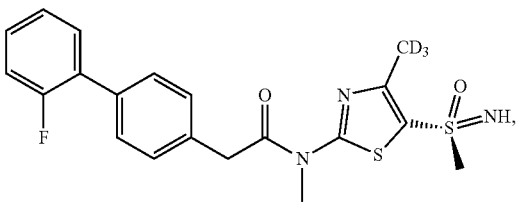
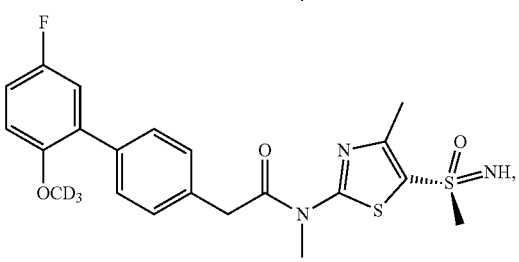
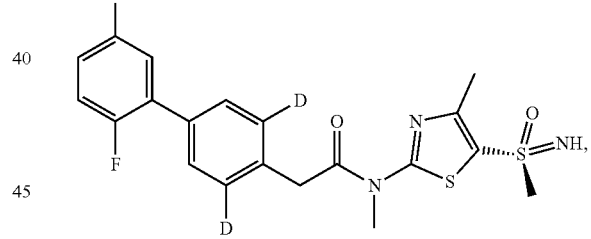
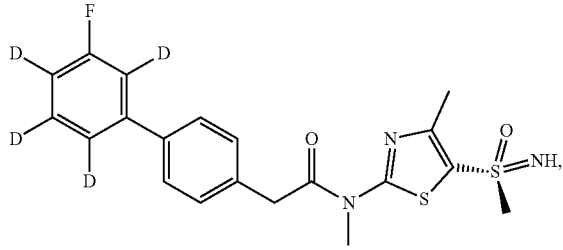
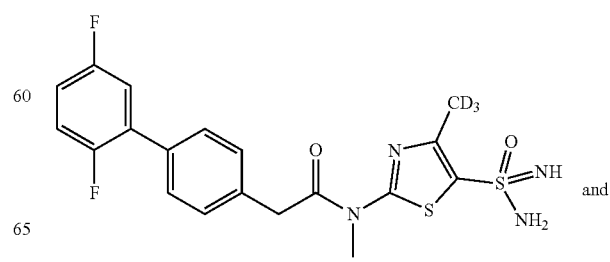
and -continued

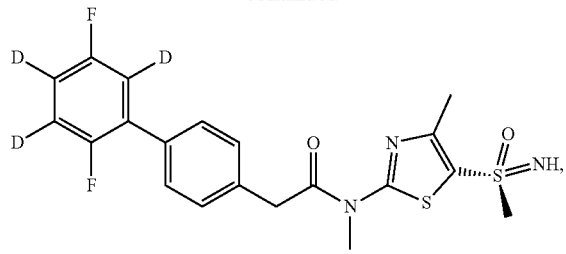

or a solvate or pharmaceutically acceptable salt thereof.

A particularly more preferred compound of the present invention is represented by one of the following formulas:

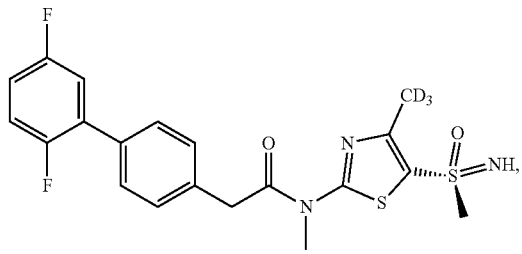 [SMILES: [2H]C([2H])([2H])c1nc(N(C)C(=O)Cc2ccc(-c3cc(F)ccc3F)cc2)sc1[S@@](C)(=N)=O]

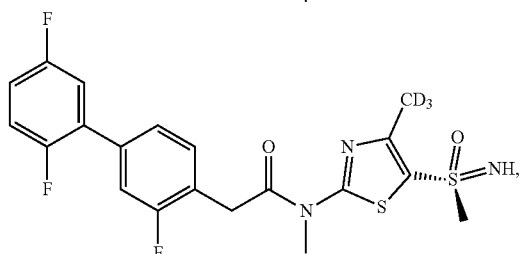

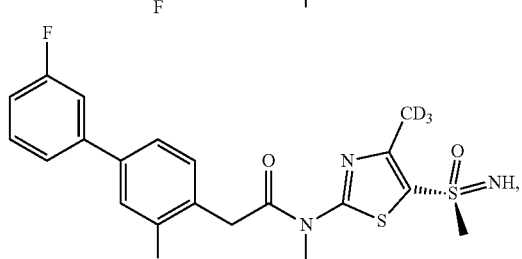

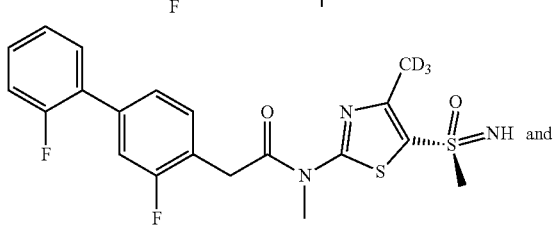

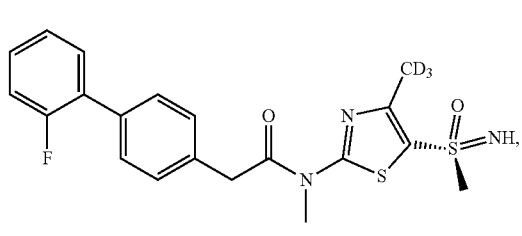

or a solvate or pharmaceutically acceptable salt thereof.

A particularly most preferred compound of the present invention is represented by the following formula:

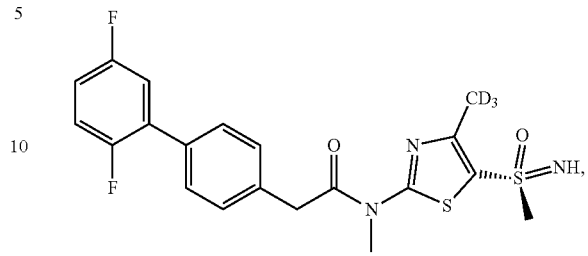

or a solvate or pharmaceutically acceptable salt thereof.

In yet another alternative preferred embodiment in combination with any of the above or below embodiments in Formula (I) the group X is

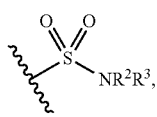

preferably X is

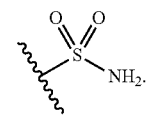 [SMILES: *S(N)(=O)=O]

Particularly alternative preferred compounds of the present invention are represented by the following formulas:

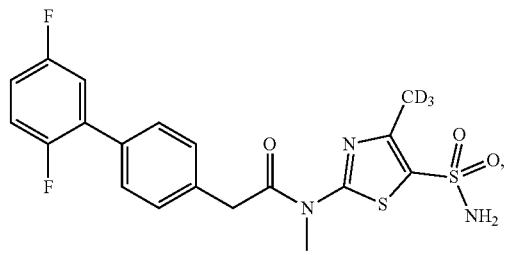 [SMILES: [2H]C([2H])([2H])c1nc(N(C)C(=O)Cc2ccc(-c3cc(F)ccc3F)cc2)sc1S(N)(=O)=O]

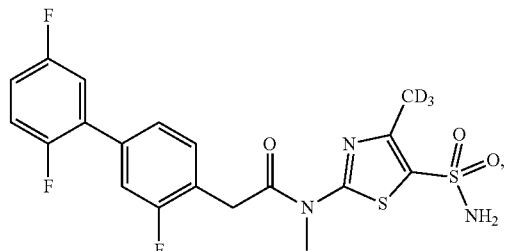

-continued

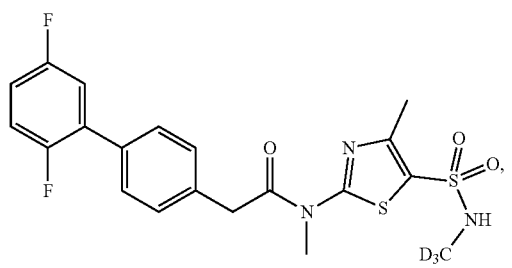

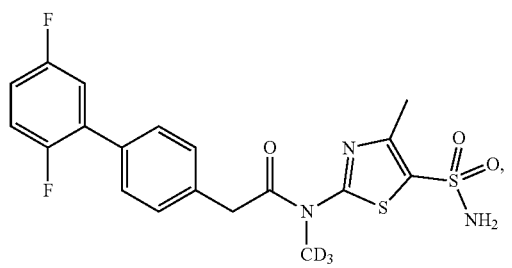

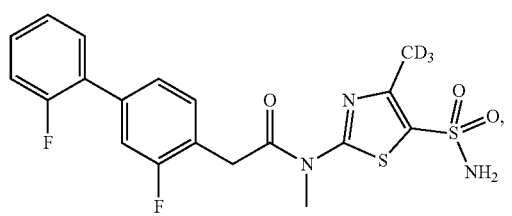

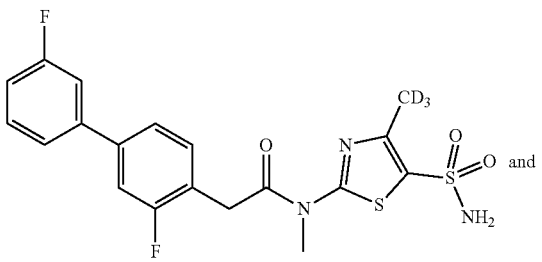

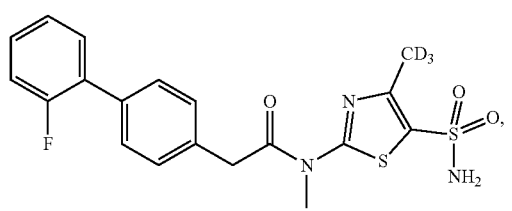

or a solvate or pharmaceutically acceptable salt thereof.

Particularly alternative more preferred compounds of the present invention are represented by the following formulas:

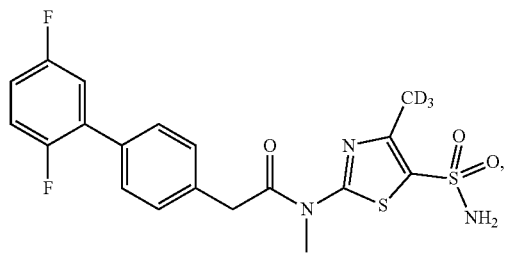

-continued

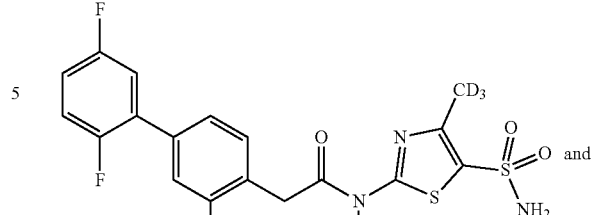

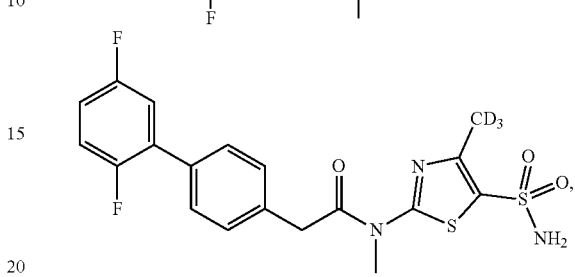

or a solvate or pharmaceutically acceptable salt thereof.

A particularly alternative most preferred compound of the present invention is represented by the following formula:

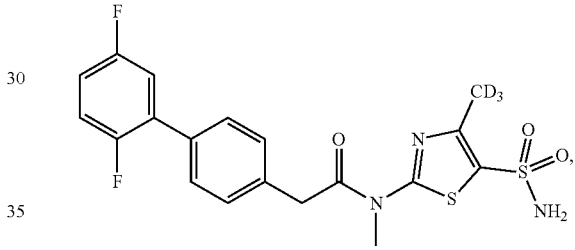

or a solvate or pharmaceutically acceptable salt thereof.

A further aspect of the present invention relates to a pharmaceutical formulation, comprising one or more of the compounds of any of the above described embodiments.

A further aspect of the present invention relates to the compounds of any of the above described embodiments for the use as a medicament.

Particularly the invention relates to the described compounds for use in the treatment or prophylaxis of a disease or disorder associated with viral infections.

More particularly the invention relates to the described compounds for use in the treatment or prophylaxis of a disease or disorder, which is associated with viral infections caused by herpes viruses, such as in particular by Herpes simplex viruses.

In a further aspect the invention relates to the described compounds for use in the treatment or prophylaxis neurodegenerative diseases caused by viruses, such as in particular Alzheimers disease caused by viruses, in particular caused by Herpes simplex viruses.

In a further aspect the invention relates to the described compounds for the use in the treatment and prophylaxis of herpes infections, in particular Herpes simplex infections in patients displaying Herpes labialis, Herpes genitalis and Herpes-related keratitis, Alzheimers disease, encephalitis, pneumonia, hepatitis; in patients with a suppressed immune system, such as AIDS patients, cancer patients, patients having a genetic immunodeficiency, transplant patients; in new-born children and infants; in Herpes-positive patients, in particular Herpes-simplex-positive patients, in patients for suppressing recurrence (suppression therapy); or for use in patients, in particular in Herpes-positive patients, in particular Herpes-simplex-positive patients, who are resistant to nucleosidic antiviral therapy such as acyclovir, penciclovir, famciclovir, ganciclovir, valacyclovir.

In a further aspect the invention relates to the described compounds, which are characterized by an $IC_{50}$ value (HSV-1/Vero) in an in vitro activity selectivity assay HSV-1 on Vero cells as described in the Examples of the present invention of preferably $IC_{50}$ below 100 µM, more preferably $IC_{50}$ below 10 µM and very particularly perferable $IC_{50}$ below 1 µM.

In a further aspect the invention relates to the described compounds, which are characterized by an $ED_{50}$ value in an in vivo animal model as described in the Examples of the present invention preferably of $ED_{50}$ of less than 10 mg/kg for HSV-1, more preferably of less than 5 mg/kg for HSV-1, and very particularly perferable of less than 2 mg/kg for HSV-1.

The compounds according to the present invention are considered for the use in the prophylaxis and treatment of the respective disorders and diseases in humans as well as in animals.

Accordingly, the invention relates to the use of the compounds as described herein for the preparation of a medicament.

Further, the invention relates to a method of treating a disease or disorder associated with viral infections, such as a disease or disorder, which is associated with viral infections caused by herpes viruses, such as in particular by Herpes simplex viruses as well as a method of treating neurodegenerative diseases caused by viruses, such as in particular Alzheimers disease, said methods comprising administering to a human or animal in need thereof an effective amount of a compound or of a composition comprising said compounds as described herein.

In practical use, the compounds used in the present invention can be combined as the active ingredient in intimate admixture with a pharmaceutical carrier according to conventional pharmaceutical compounding techniques. The carrier may take a wide variety of forms depending on the form of preparation desired for administration, e.g., oral or parenteral (including intravenous). In preparing compositions for oral dosage forms, any of the usual pharmaceutical media may be employed, such as, for example, water, glycols, oils, alcohols, flavouring agents, preservatives, colouring agents and the like in the case of oral liquid preparations, such as, for example, suspensions, elixirs and solutions; or carriers such as starches, sugars, microcrystalline cellulose, diluents, granulating agents, lubricants, binders, disintegrating agents and the like in the case of oral solid preparations such as, for example, powders, hard and soft capsules and tablets, with the solid oral preparations being preferred over the liquid preparations.

Because of their ease of administration, tablets and capsules represent the most advantageous oral dosage unit form in which case solid pharmaceutical carriers are obviously employed. If desired, tablets may be coated by standard aqueous or non-aqueous techniques. Such compositions and preparations should contain at least 0.1 percent of active compound. The percentage of active compound in these compositions may, of course, be varied and may conveniently be between about 2.0 percent to about 60.0 percent of the weight of the unit. The amount of active compound in such therapeutically useful compositions is such that an effective dosage will be obtained. The active compounds can also be administered intranasally as, for example, liquid drops or spray or as eye drops.

The tablets, pills, capsules and the like may also contain a binder such as gum tragacanth, acacia, corn starch or gelatin; excipients such as dicalcium phosphate; a disintegrating agent such as corn starch, potato starch, alginic acid; a lubricant such as magnesium stearate; and a sweetening agent such as sucrose, lactose or saccharin. When a dosage unit form is a capsule, it may contain, in addition to materials of the above type, a liquid carrier such as a fatty oil.

Various other materials may be present as coatings or to modify the physical form of the dosage unit. For instance, tablets may be coated with shellac, sugar or both. A syrup or elixir may contain, in addition to the active ingredient, sucrose as a sweetening agent, methyl and propylparabens as preservatives, a dye and a flavouring such as cherry or orange flavour.

The compounds used in the present invention may also be administered parenterally. Solutions or suspensions of these active compounds can be prepared in water suitably mixed with a surfactant such as hydroxy-propylcellulose. Dispersions can also be prepared in glycerol, liquid polyethylene glycols and mixtures thereof in oils. Under ordinary conditions of storage and use, these preparations contain a preservative to prevent the growth of microorganisms.

The pharmaceutical forms suitable for injectable use include sterile aqueous solutions or dispersions and sterile powders for the extemporaneous preparation of sterile injectable solutions or dispersions. In all cases, the form must be sterile and must be fluid to the extent that easy syringability exists. It must be stable under the conditions of manufacture and storage and must be preserved against the contaminating action of microorganisms such as bacteria and fungi. The carrier can be a solvent or dispersion medium containing, for example, water, ethanol, polyol (e.g., glycerol, propylene glycol and liquid polyethylene glycol), suitable mixtures thereof, and vegetable oils.

Any suitable route of administration may be employed for providing a mammal, especially a human, with an effective dose of a compound of the present invention. For example, oral, rectal, topical, parenteral (including intravenous), ocular, pulmonary, nasal and the like may be employed. Dosage forms include tablets, troches, dispersions, suspensions, solutions, capsules, creams, ointments, aerosols and the like. Preferably compounds of the present invention are administered orally or as eye drops, more preferably the compounds of the present invention are administered orally.

The effective dosage of active ingredient employed may vary depending on the particular compound employed, the mode of administration, the condition being treated and the severity of the condition being treated. Such dosage may be ascertained readily by a person skilled in the art.

The compounds of the present invention may also be present in combination with further active ingredients, in particular with one or more active ingredients exhibiting advantageous effects in the treatment of any of the disorders or diseases as described herein. Very particularly the compounds of the present invention are present in a composition in combination with at least one further active substance being effective in treating a disease or disorder associated with viral infections (antiviral active compounds), preferably a disease or disorder being associated with viral infections caused by herpes viruses, such as in particular by Herpes simplex viruses, thus relating to a so called combination therapy. The at least one further active substance being effective in treating a disease or disorder associated with viral infections (antiviral active compounds) are preferably selected from the group consisting of nucleosidic drugs such as acyclovir, valacyclovir, penciclovir, ganciclovir, famciclovir and trifluridine, as well as compounds such as foscarnet and cidofovir.

Accordingly, the present invention further relates to a pharmaceutical composition comprising one or more of the compounds as described herein and at least one pharmaceutically acceptable carrier and/or excipient and/or at least one further active substance being effective in treating a disease or disorder associated with viral infections (antiviral active compounds).

A further aspect of the invention relates to the use of the deuterated compounds described herein, which act as deuterated helicase primase inhibitors, in a combination therapy with oncolytic viruses for treating tumors, cancer or neoplasia.

A further embodiment of this additional aspect of the invention relates to a pharmaceutical composition for the use as an antidote in a combination therapy with oncolytic viruses for treating cancer, which comprises at least one deuterated helicase primase inhibitor as defined in any embodiment described herein, which acts to control, modulate, inhibit or shut off the activity of oncolytic viruses sensitive to said inhibitors used in cancer therapy, and which may further comprise at least one pharmaceutically acceptable carrier and/or excipient and/or at least one further active substance, such as antiviral active or immune modulating compounds, including checkpoint inhibitors, being effective in treating a disease or disorder associated with oncolytic viral infections used in the treatment of cancer.

A further embodiment of this additional aspect of the invention relates to the deuterated helicase primase inhibitors or the pharmaceutical composition for the use in a combination therapy with oncolytic viruses as described herein, wherein the cancer to be treated is solid cancer, preferably the cancer disease is selected from liver cancer, lung cancer, colon cancer, pancreas cancer, kidney cancer, brain cancer, melanoma and glioblastoma etc.

A further embodiment of this additional aspect of the invention relates to the deuterated helicase primase inhibitors or the pharmaceutical composition for the use in a combination therapy with oncolytic viruses as described herein, wherein the oncolytic viruses are oncolytic herpesviruses.

A further embodiment of this additional aspect of the invention relates to the deuterated helicase primase inhibitors or the pharmaceutical composition for the use in a combination therapy with oncolytic viruses as described herein, wherein the cancer therapy comprises infusion, injection, intratumoral injection or topical or transdermal application of the oncolytic viruses or oncolytic virus infected cells and/or of the helicase primase inhibitors or the pharmaceutical composition comprising the same.

A further embodiment of this additional aspect of the invention relates to the deuterated helicase primase inhibitors or the pharmaceutical composition for the use in a combination therapy with oncolytic viruses as described herein, wherein the oncolytic viruses or oncolytic viruses infected cells are selected from an oncolytic wildtype, a clinical isolate or a laboratory herpesvirus strain or a genetically engineered or multi-mutated optionally attenuated or boosted oncolytic herpesvirus.

A further embodiment of this additional aspect of the invention relates to a kit comprising at least one of the deuterated helicase primase inhibitors or the pharmaceutical composition for the use in a combination therapy with oncolytic viruses as described herein, and at least one oncolytic virus selected from a wildtype, a laboratory strain, a clinical isolate and a genetically engineered or multi-mutated oncolytic virus.

A further embodiment of this additional aspect of the invention relates to said kit for the use in the treatment of cancer as defined herein.

The deuterated helicase primase inhibitors, pharmaceutical composition or kit for the use in a combination therapy with oncolytic viruses as described herein may be applied to one or more of the following patient groups: infants; herpes-positive patients, in particular oncolytic herpes-simplex-positive patients, for suppressing recurrence or oncolytic viral shedding; patients, in particular herpes-positive patients, in particular oncolytic herpes-simplex-positive patients, who are resistant to nucleosidic antiviral therapy such as acyclovir, penciclovir, famciclovir, ganciclovir, valacyclovir and/or foscarnet or cidofovir.

It has unexpectedly been found that deuterated compounds as detailed herein show higher microsomal stability and improved in-vivo behavior in rodents. The following example section shows further details.

EXPERIMENTAL PART

The compounds of the present invention can be prepared as outlined in WO2001/047904, WO2017/174640 and WO2019/068817 by using appropriate deuterated building blocks or via hydrogen-deuterium exchange (e.g. A. Michelotti and M. Roche, Synthesis 2019;51:1319; J. Atzrodt et al. Angew. Chem. Int. Ed. 2018;57:3022).

Abbreviations

DMF dimethylformamide
DMSO dimethylsulfoxide
dppf 1,1'-bis(diphenylphosphino)ferrocene
EA ethyl acetate
EDCl·HCl 1-(3-dimethylaminopropyl)-3-ethylcarbodiimide hydrochloride
FCC flash chromatography on silica gel
HATU 1-[bis(dimethylamino)methylene]-1H-1,2,3-triazolo[4,5-b]pyridinium 3-oxid hexafluorophosphate
PE petroleum ether
rt room temperature (20±4° C.)
THF tetrahydrofuran Experimental Section Preparative Example P1

Step 1: Methyl 2-(2',5'-difluoro-[1,1'-biphenyl]-4-yl)acetate (P1a)

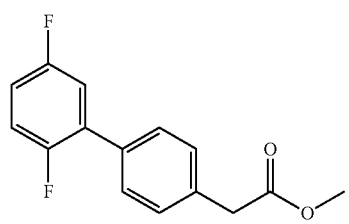 [SMILES: COC(=O)Cc1ccc(-c2cc(F)ccc2F)cc1]

To a solution of (4-bromo-phenyl)-acetic acid methyl ester (120 g, 524 mmol) in 1,4-dioxane (1.5 L) and H$_2$O (150 mL) was added 2,5-diflurophenylboronic acid (99.4 g, 629 mmol), Pd(dppf)Cl$_2$ (12.0 g, 16.4 mmol) and Na$_2$CO$_3$ (167 g, 1.57 mol). The mixture was heated at 100° C. for 1 h and then cooled to rt The organic layer was separated, concentrated and purified by FCC (PE:EA=15:1) to give compound P1 a as a yellow oil.

Step 2: 2-(2',5'-Difluoro-[1,1'-biphenyl]-4-yl)acetic acid (P1)

To a solution of compound P1a (120 g, 458 mmol) in MeOH (800 mL) and THF (200 mL) was added 5N NaOH (100 mL). The mixture was stirred at rt for 30 min, concentrated under vacuum, adjusted to pH <7 with 2N HCl and the precipitate was collected by filtration, washed with water and dried in a vacuum oven (45° C.) to give compound P1 as a white solid.

Preparative Example P2/1 to P2/6

The following Examples can be prepared similar as described for Preparative Example 1 using the appropriate building blocks as shown below.

| # | building block | structure |
|---|---|---|
| P2/1 | (3-OCD$_3$ phenyl)B(OH)$_2$ | 3'-OCD$_3$ biphenyl-4-yl acetic acid |
| P2/2 | (2-OCD$_3$ phenyl)B(OH)$_2$ | 2'-OCD$_3$ biphenyl-4-yl acetic acid |
| P2/3 | 2-fluoro-3,4,5,6-tetradeutero phenylboronic acid<br>2241870-71-1 | 2'-fluoro-3',4',5',6'-tetradeutero biphenyl-4-yl acetic acid |
| P2/4 | 2,4,6-trifluoro-3,5-dideutero bromobenzene<br>1219795-54-6<br>(via -Br to -B(OH)$_2$ exchange) | 2',4',6'-trifluoro-3',5'-dideutero biphenyl-4-yl acetic acid |

| # | building block | structure |
|---|---|---|
| P2/5 | F, Br, OCD₃ 1185306-38-0 (via -Br to -B(OH)₂ exchange) | F, OCD₃, O, OH |
| P2/6 | Br, D, D, O, O-Me (via Ir-catalysed synthesis: Chem. Eur. J. 2019:25;6517) | F, F, D, D, D, O, OH |

Example 1—2-(2',5'-Difluoro-[1,1'-biphenyl]-4-yl)-N-methyl-N-(4-(methyl-d₃)-5-(S-methyl-sulfonimidoyl)thiazol-2-yl)acetamide Step 1: 1-Bromopropan-2-one-1,1,3,3,3-d₅ (1a)

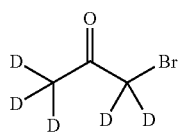

Br₂ (2.5 g, 15 mmol) was added to propan-2-one-d₆ (2.0 g, 31 mmol) at rt and after stirring for 2 h, the mixture was used in next step immediately.

Step 2: N-Methyl-4-(methyl-d₃)thiazol-2-amine (1b)

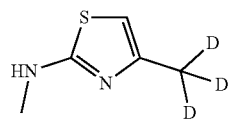

To a solution of compound 1a in EtOH (20 mL) was added 1-methylthiourea (1.4 g, 15 mmol) at 75° C. and after stirring for 2 h, a saturated NaHCO₃ solution was added. The mixture was extracted with EA (2×20 mL). The combined organic layer was dried over Na₂SO₄, filtered, concentrated and then purified by FCC (EA:PE=1:1) to give compound 1b.

Step 3: 5-Bromo-N-methyl-4-(methyl-d₃)thiazol-2-amine (1c)

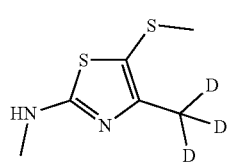

To a solution of compound 1b (400 mg, 3.0 mmol) in CHCl₃ (4 mL) was added Br₂ (740 mg, 4.7 mmol) at rt and after stirring overnight, water (10 mL) was added. The pH was adjusted to 8 with a saturated NaHCO₃ solution. The mixture was extracted with CHCl₃ (2×10 mL). The combined organic layer was washed with brine (10 mL), dried over Na₂SO₄, filtered and concentrated to give compound 1c as a solid.

Step 4: N-Methyl-4-(methyl-d₃)-5-(methylthio)thiazol-2-amine (1d)

To a solution of compound 1c (350 mg, 1.6 mmol) in 1,4-dioxane (4 mL) was added MeSNa (230 mg, 3.2 mmol) at rt. After stirring overnight, the mixture was evaporated to get an oil, which was then purified by FCC (EA:PE=1:1) to give compound 1d as a yellow solid.

Step 5: 2-(2',5-Difluoro-[1,1'-biphenyl]-4-yl)-N-methyl-N-(4-(methyl-d₃)-5-(methylthio)thiazol-2-yl)acetamide (1e)

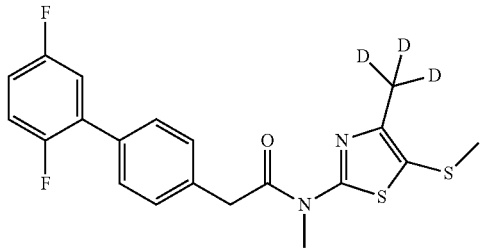 [SMILES: [2H]C([2H])([2H])c1nc(N(C)C(=O)Cc2ccc(-c3cc(F)ccc3F)cc2)sc1SC]

To a solution of compound P1 (140 mg, 0.56 mmol), HATU (322 mg, 0.85 mmol) and Et₃N (171 mg, 0.85 mmol) in CH₂Cl₂ (2.0 mL) was added compound 1d (100 mg, 0.56 mmol) at rt. After stirring overnight, the mixture was washed with water (2×2.5 mL). The organic layer was dried over Na₂SO₄, filtered, concentrated and purified by FCC (PE: EA=2:1) to give compound 1e as a white solid.

Step 6: 2-(2',5-Difluoro-[1,1'-biphenyl]-4-yl)-N-methyl-N-(4-(methyl-d₃)-5-(methylsulfinyl)thiazol-2-yl)acetamide (1f)

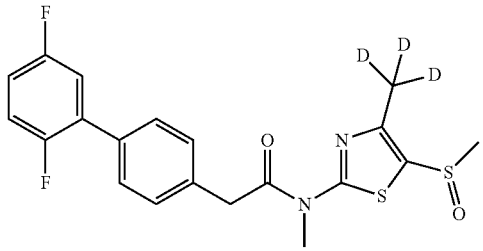 [SMILES: [2H]C([2H])([2H])c1nc(N(C)C(=O)Cc2ccc(-c3cc(F)ccc3F)cc2)sc1S(C)=O]

To a solution of compound 1e (180 mg, 0.44 mmol) in CH₂Cl₂ (1 mL) was added meta-chloroperoxybenzoic acid (76 mg, purity 85%). The mixture was stirred at rt for 20 min, partitioned between CH₂Cl₂ and 5 percent sodium carbonate solution. The organic phase was washed with brine, dried over Na₂SO₄, filtered, concentrated and purified by FCC (PE:EA=1:2) to give compound 1f as a white solid.

Step 7: tert-Butyl ((2-(2-(2',5'-difluoro-[1,1'-biphenyl]-4-yl)-N-methylacetamido)-4-(methyl-d₃)thiazol-5-yl)(methyl)(oxo)-l₆-sulfaneylidene)carbamate (1g)

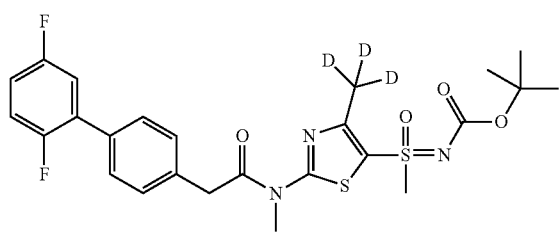 [SMILES: [2H]C([2H])([2H])c1nc(N(C)C(=O)Cc2ccc(-c3cc(F)ccc3F)cc2)sc1S(C)(=O)=NC(=O)OC(C)(C)C]

MgO (57 mg, 1.40 mmol), tert-butyl carbamate (83 mg, 0.70 mmol), Rh₂(OAc)₄ (15 mg, 33 μmol) and (diacetoxy)iodobenzene (171 mg, 0.52 mmol) were added to a solution of compound 1f (150 mg, 0.35 mmol) in CH₂Cl₂ (2.5 mL). The mixture was stirred at 40° C. overnight, cooled to rt and filtered through a pad of celite. The solvent was removed under reduced pressure and the crude product was purified by FCC (PE:EA=1:1) to give compound 1g as a white solid.

Step 8: 2-(2',5'-Difluoro-[1,1'-biphenyl]-4-yl)-N-methyl-N-(4-(methyl-d₃)-5-(S-methylsulfon-imidoyl)thiazol-2-yl)acetamide (1)

(1)

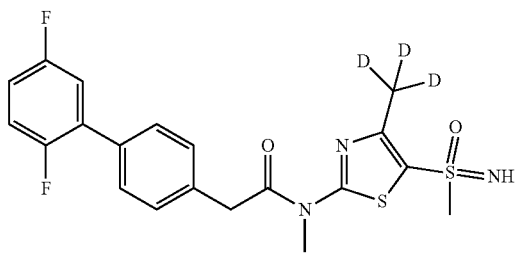

At ambient temperature, compound 1g (150 mg, 0.28 mmol) was added to a stirred solution of trifluoroacetic acid (2 mL) acid in CH₂Cl₂ (8 mL). Stirring was continued for 1 h, then the mixture was concentrated, resolved in CH₂Cl₂, washed with saturated NaHCO₃ (2×20 mL), dried over Na₂SO₄, filtered, concentrated and purified by prep-HPLC to give compound 1 as a white solid.

¹H-NMR (400 MHz, DMSO-d₆) δ: 7.57 (d, J=7.2 Hz, 2H), 7.46-7.35 (m, 4H), 7.31-7.24 (m, 1H), 4.69 (s, 1H), 4.23 (s, 2H), 3.72 (s, 3H), 3.14 (s, 3H). MS: 439.1 [M+1]⁺.

Example 2—2-(2',5'-Difluoro-[1,1'-biphenyl]-4-yl)-N-methyl-N-(4-methyl-5-(S-(methyl-d₃)-sulfonimidoyl)thiazol-2-yl)acetamide (2)

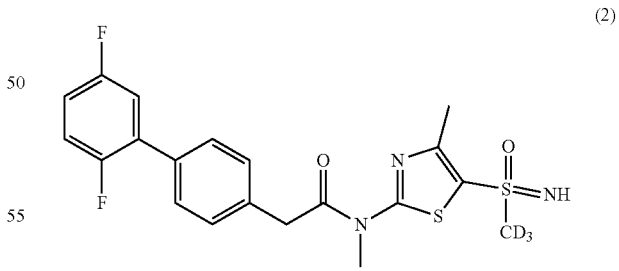

By applying the route as outlined in Example 1 by using propan-2-one instead of propan-2-one-d₆ (Step 1) and CD₃SNa instead MeSNa (Step 4) the target compound can be obtained. CD₃SNa can optionally be prepared from commercially available methane-d₃-thiol (CAS: 73142-81-1) or methanethiol-d₄ (CAS: 65871-23-0).

Example 3—2-(2',5'-Difluoro-[1,1'-biphenyl]-4-yl)-N-(methyl-d₃)-N-(4-methyl-5-(S-methyl-sulfonimidoyl)thiazol-2-yl)acetamide

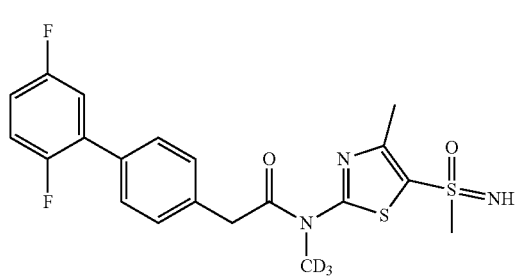

(3)

By applying the route as outlined in Example 1 by using propan-2-one instead of propan-2-one-d₆ (Step 1) and 1-(methyl-d₃)thiourea instead 1-methylthiourea (Step 2) the target compound can be obtained.

Example 4/1 to 4/22

By applying the route as outlined above using appropriate building blocks, the following target compounds can be obtained, which can be separated into its enantiomers as described in WO2019/068817.

| # | structure |
|---|---|
| 4/1 | |
| 4/2 | |
| 4/3 | |
| 4/4 | |

-continued

| # | structure |
|---|---|
| 4/5 | |
| 4/6 | |
| 4/7 | |
| 4/8 | |
| 4/9 | |
| 4/10 | |

| # | structure |
|---|---|
| 4/11 | 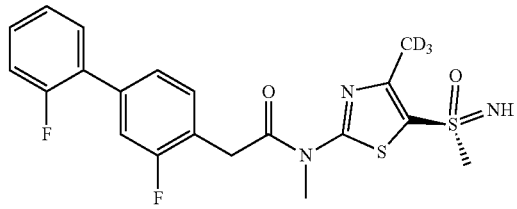 [SMILES: [2H]C([2H])([2H])c1nc(N(C)C(=O)Cc2ccc(-c3ccccc3F)cc2F)sc1[S@](C)(=N)=O] |
| 4/12 | 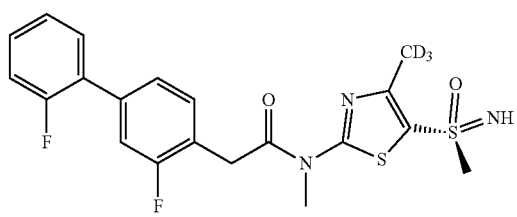 [SMILES: [2H]C([2H])([2H])c1nc(N(C)C(=O)Cc2ccc(-c3ccccc3F)cc2F)sc1[S@@](C)(=N)=O] |
| 4/13 | 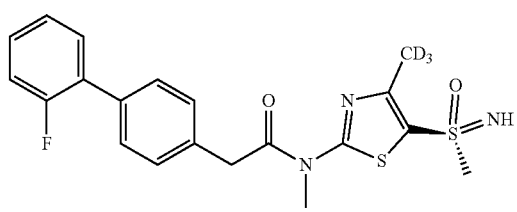 [SMILES: [2H]C([2H])([2H])c1nc(N(C)C(=O)Cc2ccc(-c3ccccc3F)cc2)sc1[S@](C)(=N)=O] |
| 4/14 | 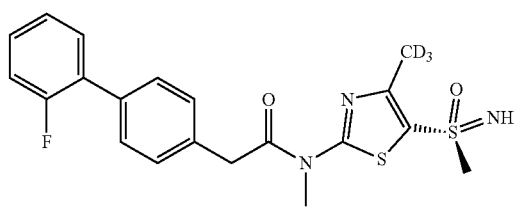 [SMILES: [2H]C([2H])([2H])c1nc(N(C)C(=O)Cc2ccc(-c3ccccc3F)cc2)sc1[S@@](C)(=N)=O] |
| 4/15 | 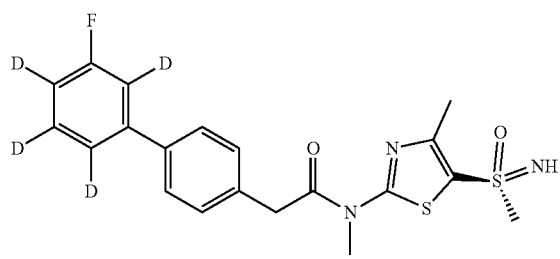 [SMILES: [2H]c1c([2H])c(F)c([2H])c(-c2ccc(CC(=O)N(C)c3nc(C)c([S@](C)(=N)=O)s3)cc2)c1[2H]] |
| 4/16 | 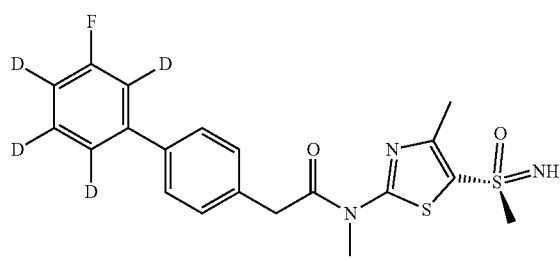 [SMILES: [2H]c1c([2H])c(F)c(-c2ccc(CC(=O)N(C)c3nc(C)c([S@@](C)(=N)=O)s3)cc2)c([2H])c1F] |

-continued

| # | structure |
|---|---|
| 4/17 | |
| 4/18 | |
| 4/19 | |
| 4/20 | |
| 4/21 | |
| 4/22 | |

Example 5—2-([1,1'-Biphenyl]-4-yl-2',3',4',5',6'-d$_5$)-N-methyl-N-(4-methyl-5-sulfamoyl-thiazol-2-yl) acetamide

Step 1: 2-(4-Bromophenyl)-N-methyl-N-(4-methyl-5-sulfamoylthiazol-2-Aacetamide (5a)

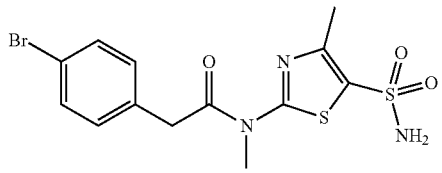 [SMILES: Cc1nc(N(C)C(=O)Cc2ccc(Br)cc2)sc1S(N)(=O)=O]

To the mixture of 2-(4-bromophenyl)acetic acid (5.00 g, 23.3 mmol) in DMF (50 mL) was added 4-methyl-2-(methylamino)thiazole-5-sulfonamide (4.80 g, 23.2 mmol), HOBt (3.50 g, 25.7 mmol) and EDCl·HCl (4.90 g, 25.7 mmol). The mixture was stirred at rt for 3 h, poured into water (500 mL) and filtered. The filtrated cake was dried to give intermediate 5a as a white solid.

Step 2: 2-([1,1'-Biphenyl]-4-yl-2',3',4',5',6'-d$_5$)-N-methyl-N-(4-methyl-5-sulfamoylthiazol-2-yl)acetamide (5)

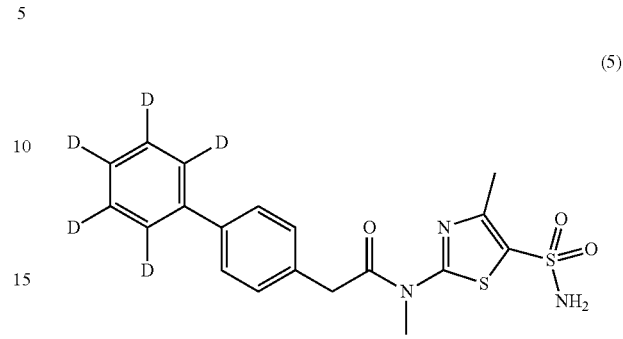

To the mixture of compound 5a (202 mg, 0.50 mmol) in dioxane/H$_2$O (5 mL/0.5 mL) was added (phenyl-d$_5$)boronic acid (64 mg, 0.50 mmol), Pd(dppf)Cl$_2$ (18 mg) and K$_2$CO$_3$ (138 mg, 1.00 mmol) and the mixture was stirred at 90° C. for 4 h, cooled to rt, poured into water (50 mL) and extracted with EA (3×30 mL). The combined organic layer was washed with brine (30 mL), dried over Na$_2$SO$_4$, filtered, concentrated and purified by prep-HPLC to compound 5 as a white solid. $^1$H-NMR (400 MHz, DMSO-d$_6$) δ: 7.65 (d, J=7.6 Hz, 4H), 7.36 (d, J=8.4 Hz, 2H), 4.20 (s, 2H), 3.71 (s, 3H), 2.48 (s, 3H). MS: 407.1 [M+1]$^+$.

Example 5/1 to 5/2

The following Examples were prepared similar as described for Example 5 using the appropriate building blocks.

| # | building block | structure | analytical data |
|---|---|---|---|
| 5/1 | ![3-OCD3 phenylboronic acid] | ![structure 5/1] | $^1$H-NMR (400 MHz, DMSO-d$_6$) δ: 7.65-7.63 (m, 4H), 7.39-7.33 (m, 3H), 7.22 (d, J = 7.6 Hz, 1H), 7.18 (t, J = 4.5 Hz, 1H), 6.92 (dd, J = 8.2, 1.8 Hz, 1H), 4.19 (s, 2H), 3.70 (s, 3H), 2.47 (s, 3H). MS: 435.1 [M + 1]$^+$. |
| 5/2 | ![2-OCD3 phenylboronic acid] | ![structure 5/2] | $^1$H-NMR (400 MHz, DMSO-d$_6$) δ: 7.65 (s, 2H), 7.45 (d, J = 8.4 Hz, 2H), 7.36-7.28 (m, 4H), 7.10 (d, J = 7.6 Hz, 1H), 7.03 (t, J = 7.4 Hz, 1H), 4.18 (s, 2H), 3.72 (s, 3H), 2.48 (s, 3H). MS: 435.0 [M + 1]$^+$. |

Example 6—2-(2',5'-Difluoro-[1,1'-biphenyl]-4-yl)-N-methyl-N-(4-(methyl-d₃)-5-sulfamoylthiazol-2-yl)acetamide

Step 1: 4-(Methyl-d₃)thiazol-2-amine (6a)

Br₂ (7.0 g, 44 mmol) was added to propan-2-one-d₆ (10 mL) at rt and after stirring for 5 h. This solution was diluted in EtOH (50 mL) and heated to 75° C. Then thiourea (3.30 g, 43.4 mmol) was added and the mixutre was stirred for 2 h, diluted with a saturated NaHCO₃-solution and extracted with EA (50 mL) twice. The combined organic layer was dried over Na₂SO₄, filtered, concentrated and purified by FCC (PE:EA=1:1) to give compound 6a as a yellow oil.

Step 2: 2-Chloro-4-(methyl-d₃)thiazole (6b)

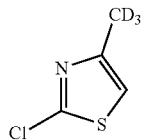

Isoamyl nitrite (2.40 g, 20.5 mmol) was added to a solution of compound 6a (1.60 g, 13.7 mmol) and copper (II)chloride dihydrate (2.30 g, 13.5 mmol) in MeCN (10 mL) at 0° C. The mixture was stirred 16 h at rt, concentrated in vacuum, redissolved in CHCl₃ and filtered through celite. The filtrate was concentrated and purified by FCC (PE:EA=15:1) to give compound 6b as a yellow oil.

Step 3: 2-Chloro-4-(methyl-d₃)thiazole-5-sulfonyl chloride (6c)

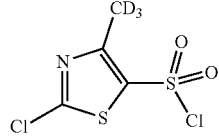 [SMILES: [2H]C([2H])([2H])c1nc(Cl)sc1S(=O)(=O)Cl]

To compound 6b (0.80 mg, 5.86 mmol) was added dropwise a solution of thionyl chloride (1.1 mL, 15 mmol) and chlorosulfonic acid (3.9 mL, 59 mmol). The mixture was stirred at 120° C. overnight, cooled to rt, quenched with ice water and extracted with CH₂Cl₂ (3×30 mL). The combined organic layers was dried over Na₂SO₄, filtered, concentrated and purified by FCC (PE:EA=10:1) to give compound 6c as a yellow oil.

Step 4: 2-Chloro-4-(methyl-d₃)thiazole-5-sulfonamide (6d)

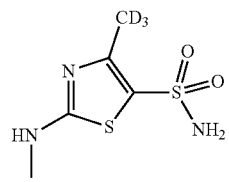

Compound 6c (0.71 g, 3.0 mmol) was treated with NH₃·H₂O in THF (5 mL) and stirred until consumption of the starting material occurred (TLC monitoring, concentrated and purified by FCC (PE:EA=2:1) to give compound 6d as an off-white solid.

Step 5: 4-(Methyl-d₃)-2-(methylamino)thiazole-5-sulfonamide (6e)

Compound 6d (608 mg, 2.82 mmol) was dissolved in MeCN and treated with H₂NMe (2M in THF, 3.3 equiv) at 50° C. until consumption of the starting material (TLC monitoring). The solution was cooled to rt and concentrated to give a residue that was treated with H₂O. The solid formed was collected by filtration and dried under vacuum to give compound 6e as an off-white solid.

Step 6: 2-(2',5'-Difluoro-[1,1'-biphenyl]-4-yl)-N-methyl-N-(4-(methyl-d₃)-5-sulfamoylthiazol-2-yl)acetamide (6)

(6)

Compound P1 (100 mg, 476 μmol) was dissolved in dry DMF and treated with HOBt (54 mg, 0.40 μmol) for 10 min at rt, followed by addition of compound 6e (92 mg, 0.44 mmol) and EDCl·HCl (84 mg, 0.44 mmol). The mixture was stirred at rt under a nitrogen atmosphere overnight, concentrated and purified by reversed-phase chromatography (C18) (MeCN:0.5% NH₄HCO₃=0-100%) to give compound 6 as a white solid. ¹H-NMR (400 MHz, DMSO-d₆) δ: 7.66 (s, 2H), 7.57 (d, J=7.2 Hz, 2H), 7.49-7.34 (m, 4H), 7.32-7.20 (m, 1H), 4.23 (s, 2H), 3.72 (s, 3H). MS: 441.1 [M+1]⁺.

Example 6/1 to 6/2

The following Examples were prepared similar as described for Example 6 using the appropriate building blocks.

| # | building block | structure | analytical data |
|---|---|---|---|
| 6/1 | | | $^1$H-NMR (400 MHz, DMSO-d$_6$) δ: 7.66 (s, 2H), 7.63-7.48 (m, 5H), 7.43 (t, J = 7.8 Hz, 1H), 7.26-7.22 (m, 1H), 4.27 (s, 2H), 3.77 (s, 3H). MS: 441.1 [M + 1]$^+$. |
| 6/2 | | | $^1$H-NMR (400 MHz, DMSO-d$_6$) δ: 7.67 (s, 2H), 7.57-7.24 (m, 6H), 4.29 (s, 2H), 3.77 (s, 3H). MS: 459.1 [M + 1]$^+$. |

Comparative Example 6/3

By applying the route as outlined above for Example 6 by using appropriate building blocks, the following target compound can be obtained.

| # | building block | structure |
|---|---|---|
| C6/3 | | |

Example 7—2-(2',5'-Difluoro-[1,1,'-biphenyl]-4-yl)-N-methyl-N-(4-methyl-5-(N-(methyl-d3)sulfamoyl)thiazol-2-yl)acetamide

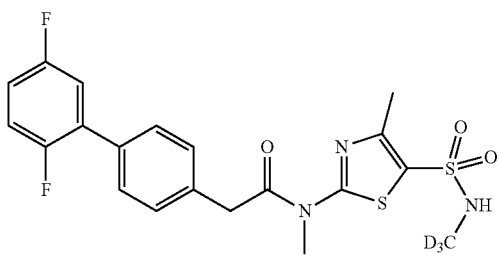

(7)

By applying the route as outlined in Example 6 by using (methyl-d₃)amine (CAS: 5581-55-5) instead of NH₃·H₂O (Step 4) the target compound can be obtained.

Example 8—2-(2',5'-Difluoro-[1,1'-biphenyl]-4-yl)-N-(methyl-d3)-N-(4-methyl-5-sulfamoyl-thiazol-2-yl)acetamide

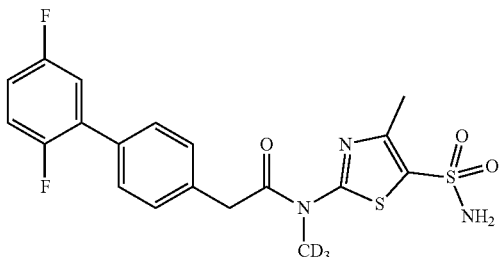 [SMILES: [2H]C([2H])([2H])c1nc(N(C)C(=O)Cc2ccc(-c3cc(F)ccc3F)cc2F)sc1S(N)(=O)=O]

(8)

By applying the route as outlined in Example 6 by using (methyl-d₃)amine (CAS: 5581-55-5) instead of H₂NMe (Step 5) the target compound can be obtained.

Example 9/1 to 9/2

By applying the route as outlined above using appropriate building blocks, the following target compounds can be obtained.

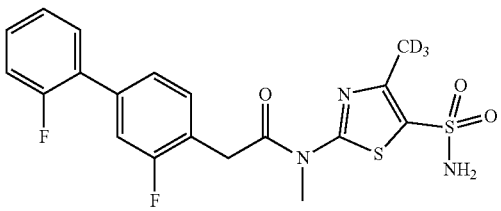

9/1

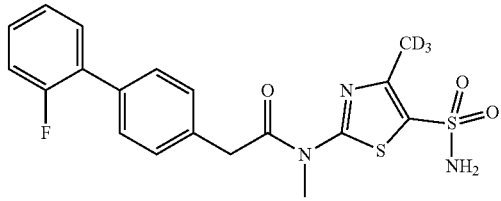

9/2

Example 10—2-(2',5'-Difluoro-[1,1'-biphenyl]-4-yl)-N-(methyl-d3)-N-(4-methyl-5-sulfamoyl-thiazol-2-yl)acetamide

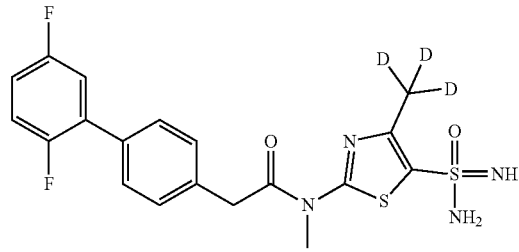

(10)

By applying the route outlined in WO2017/174640 (Example 3) using appropriate building blocks, the target compounds can be obtained.

Chromatographic Separation of Example 1 and Isolation of Two Isomers

The crude of Example compound 1 (300 mg) was separated by chiral-HPLC to give enantiomer 4/2 and enantiomer 4/1 as an white solids, respectively, by using the following column and conditions:
Instrument: SFC-150 (Thar, Waters)
Column: OJ 20*250 mm, 10 µm (Daicel)
Column temperature: 35° C.
Mobile phase: CO₂/2-propanol (55:45)
Flow rate: 100 g/min
Back pressure: 100 bar
Detection wavelength: 214 nm
Cycle time: 3.7 min
Sample solution: 300 mg dissolved in 40 mL methanol
Injection volume: 1.0 mL
Example 4/2 is the first eluting enantiomer. Said enantiomer is further characterized by a negative specific optical rotation of $[\alpha]^{19.8}_{Hg365\ nm}$=−22.8±0.3° (c=0.434 g/100 mL, MeOH). ¹H-NMR (DMSO-d₆, 400 MHz) δ: δ7.57 (dd, J=8.0, 1.6 Hz, 2H), 7.45-7.35 (m, 4H), 7.30-7.24 (m, 1H), 4.70 (br s, 1H), 4.24 (s, 2H), 3.72 (s, 3H), 3.14 (s, 3H). MS found: 439.1 [M+H]⁺.
Example 4/1 is the second eluting enantiomer. Said enantiomer is further characterized by a positive specific optical rotation of $[\alpha]^{19.8}_{Hg365\ nm}$ and the ¹H-NMR and MS is identical to Example 4/2.

In-Vitro Activity

Viruses and Cells

The in-vitro activity for (HSV-1 infected Vero), (HSV-2 infected Vero) and (HSV-1 (ACV resistant) infected vero)

was tested as outlined in WO2017/174640 and WO2019/068817. The results for some compounds are summarized in TABLE 1 below. For comparison, the non-deuterated matched-pair to Example 1 of the present application has been tested, which is hereinafter designated as Comparative Example C7 and which corresponds to Example 7 of WO2017/174640.

Comparative Example C7/(undeuterated) Example 7 of WO2017/174640:

TABLE 1

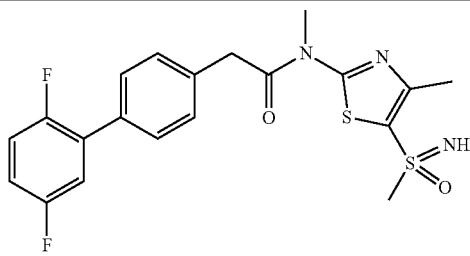

C7

| Example | $IC_{50}$ (HSV-1 infected Vero) | $IC_{50}$ (HSV-2 infected Vero) | $IC_{50}$ (HSV-1 ACV resistant) |
|---|---|---|---|
| C7 | 25-100 nM | 25-100 nM | 25-100 nM |
| 1 | 25-125 nM | 25-125 nM | 25-125 nM |

TABLE 1-continued

| | | | |
|---|---|---|---|
| 4/1 | 50-150 nM | 50-250 nM | 50-150 nM |
| 4/2 | 5-75 nM | 10-90 nM | 5-75 nM |
| 5 | 1-50 nM | 25-125 nM | 1-50 nM |
| 5/1 | 10-100 nM | 5-75 nM | 10-100 nM |
| 5/2 | 10-100 nM | 30-150 nM | 10-100 nM |
| 6 | 2-60 nM | 2-60 nM | 2-60 nM |
| 6/1 | 2-60 nM | 4-75 nM | 2-60 nM |
| 6/2 | 2-60 nM | 3-75 nM | 2-60 nM |

Microsomal Stability

Example 1 and the non-deuterated matched pair (Comparative Example C7/Example 7 from WO2017/174640) were incubated using three different batches of human liver microsomes (HLM) for a period of 60 min. The conversion to the hydroxylated metabolite was monitored by LC-MS.

| Test item | Species HLM batch | | Parent [nM] 60 min | O-metabolite [nM] 60 min | % of parent | Mean % of parent | SD |
|---|---|---|---|---|---|---|---|
| Comp. Example C7 | 38292 | $1^{st}$ | 1053 | 27.4 | 2.60 | 3.07 | 1.00 |
| | | $2^{nd}$ | 1255 | 35.9 | 2.86 | | |
| | 6029002 | $1^{st}$ | 937 | 21.6 | 2.30 | | |
| | | $2^{nd}$ | 973 | 19.7 | 2.02 | | |
| | 5061002 | $1^{st}$ | 1122 | 50.1 | 4.46 | | |
| | | $2^{nd}$ | 910 | 37.6 | 4.13 | | |
| Example 1 | 38292 | $1^{st}$ | 1085 | 1.1 | 0.10 | 0.11 | 0.03 |
| | | $2^{nd}$ | 928 | 1.4 | 0.15 | | |
| | 6029002 | $1^{st}$ | 1231 | 0.9 | 0.07 | | |
| | | $2^{nd}$ | 1159 | 0.9 | 0.08 | | |
| | 5061002 | $1^{st}$ | 1083 | 1.1 | 0.10 | | |
| | | $2^{nd}$ | 1058 | 1.3 | 0.13 | | |

By deuterating the metabolic weak spot (4-methyl at the thiazole core towards 4-methyl-d$_3$), the conversion to the hydroxylated metabolite was reduced by a factor of ~27 to 0.11±0.03% as compared to 3.07±1.00% for the non-deuterated matched pair (Comparative Example C7).

Additional Microsomal Stability

The formation of the hydroxy metabolites was quantified via peak area ratio towards the corresponding non-deuterated matched pair when incubating the samples in rat microsomes (SD rat, male) or human microsomes (mixed gender) for 60 min at Admescope. The peak signal (positive mode) was quantified with a Waters Acquity UPLC+Thermo Q-Exactive Focus Orbitrap MS on a Phenomenex Kinetex Biphenyl (2.1×50 mm, 1.7 μm particle size 10 Å) column. The data is as follows:

| Comparative Example C6 non-deuterated matched pair to Example 6 | Example 6 | relative peak ratio |
|---|---|---|
| SD rat (male): 0.027112 | 0.001824 | 15 |
| human (mixed gender): 0.060616 | BLQ | — |

| Comparative Example C4/2 non-deuterated matched pair to Example 4/2 | Example 4/2 | |
|---|---|---|
| SD rat (male): 0.595802 | 0.012020 | 50 |
| human (mixed gender): 1.970034 | 0.015409 | 128 |

The detection of hydroxylated metabolite of deuterated eutomeric enantiomer Example 4/2 and non-deuterated matched pair (Comparative Example C4/2/Example 7(—) from WO2017/174640) showed again a dramatically improved microsomal stability for the deuterated analog towards the oxidation of the metabolic weak spot (4-methyl at the thiazole core), similar as shown with the racemate above (Example 1 vs. Comparative Example C7). A similar trend can be observed for Example 6 compared to the non-deuterated matched pair (Comparative Example C6).

Pharmacokinetics in Mouse

The pharmacokinetics of the deuterated compound Example 4/2 of the present invention was evaluated in 3 male mice (strain C57Bl/6N, weight 21-26 g) after oral or intravenous cassette dosing to assess the oral bioavailability compared to the non-deuterated matched-pair (Comparative Example C4/2/Example 7(—) from WO2017/174640, also known as IM-250 (see Sci. Transl. Med. 2021;13:eabf8668). The compounds were formulated in 5% DMSO and 95% aq. HPMC (0.5%) for p.o. and 10% DMSO and 90% serum for i.p. At each designated time point (0.25, 0.5, 1, 2, 4, 8 and 24 h after dosing for p.o; 0.083, 0.25, 0.5, 1, 4, 8 and 24 h after dosing for i.v.). Plasma from the retrobulbar venous plexus was analyzed by LC-MS. The obtained data obtained is as follows (NC=not calculable):

| Animal Species | Mouse | | | |
|---|---|---|---|---|
| Strain | C57Bl/6N | | | |
| Gender | male | | | |
| BW range (g) | 21-25 | 22-26 | 21-25 | 22-26 |
| Dose route | po | Iv | po | iv |
| PK analysis software | Kinetica 5.0 | | Kinetica 5.0 | |
| Dosage (mg/kg) | 10 | 2 | 10 | 2 |
| Appl. Volume (mL/kg) | 5 | 2 | 5 | 2 |

| Test item | Comparative Example C4/2 | | Example 4/2 | |
|---|---|---|---|---|
| Mol. Weight | 435.5 | | 438.53 | |
| $C_{max}$ (ng/mL) | 2960 | — | 4607 | — |
| $C_0$ (ng/ml) | — | 10.4 | — | 16.2 |
| $t_{max}$ (h) | 4.0 | — | 4.0 | — |
| $C_z$ (ng/ml) | 1258 | 71.5 | 2727 | 162 |
| $t_z$ (h) | 24 | 24 | 24 | 24 |
| $t_{1/2z}$ (h) | NC | 7.7 | NC | 11.3 |
| $AUC_{(0-tz)}$ (ng*h/mL) | 46645 | 5597 | 80231 | 7997 |
| $AUC_{(0-inf)}$ (ng*h/mL) | NC | 6390 | NC | 10648 |
| % $AUC_{extra}$ | NC | 12.4 | NC | 24.9 |
| $V_{z/f}$ (mL/kg) | NC | — | NC | — |
| $CL_{/f}$ (mL/(h*kg)) | NC | — | NC | — |
| $V_z$ (mL/kg) | — | 3472 | — | 3074 |
| CL (mL/(h*kg)) | — | 313 | — | 188 |
| Bioavailability (%)* | 167 | — | 201 | — |

The non-deuterated compound according to Comparative Example C4/2 itself has already a quite good bioavailability and AUC. By selective deuteration (Example 4/2), this bioavailabilty and AUC can be further improved, which can be attributed to the diminished metabolism, as shown with the reduced clearance (CL) for Example 4/2. This surprisingly provides compounds with improved stability, including improved bioavailability, improved AUC and improved metabolic stability. The improved stability is beneficial and more convenient for suppression therapy, since it allows a longer dosing interval (e.g. once weekly) or allows the use of a lower dose to result in a similar therapeutic benefit compared to the non-deuterated derivative.

Bioavailability of more than 100% is a common phenomena. F % greater than 100% is relative to the i.v. administration, assuming that the clearance after i.v. and p.o. administration is linear and does not change. The rate of elimination is controlled by the rate of absorption and possible reasons might be a sustained drug release, a delayed compound clearance or reentering of the systemic circulation.

Brain Exposure and Brain-to-Plasma Ratio in Mouse

The brain and plasma exposure for Example 6 as well as for Example 4/2 and for its non-deuterated matched-pair (Comparative Example C4/2/Example 7(—) from WO2017/174640) was asessed in 3 mice (strain C57BI/6N, weight 21-26 g) after oral cassette dosing with a dose of 10 mg/kg each after 4 h. The compounds were formulated in 5% DMSO and 95% aq. HPMC (0.5%). All animals showed a normal behaviour and there were no clinical signs observed after dosing. Plasma from the retrobulbar venous plexus was analyzed by LC-MS. The obtained data obtained is as follows:

|  | Example 6 | Example 4/2 | Comparative Example C4/2 |
| --- | --- | --- | --- |
| mean plasma conc. [ng/ml] with SD | 4129 ± 1759 | 5474 ± 1316 | 3582 ± 726 |
| mean brain conc. [ng/ml] with SD | 3220 ± 1907 | 8609 ± 2178 | 5612 ± 1449 |
| brain-to-plasma ratio | 0.78 | 1.57 | 1.57 |

As shown before in the pharmacokinetics experiment, the plasma and brain exposure is improved in the deuterated Example 4/2 by over 50% compared to the non-deuterated matched-pair (Comparative Example C4/2/Example 7(—) from WO2017/174640) after 4 h. Example 6, containing a primary sulfonamide, aready shows brain exposure, which can be further improved by replacing the primary sulfonamide by a methylated sulfoximine moiety as in Example 4/2. A high brain exposure is beneficial in the treatment of e.g. herpes encephalitis and Alzheimer disease.

The invention claimed is:
1. A compound of Formula (I):

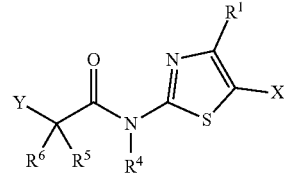

or an enantiomer, diastereomer, tautomer, solvate, or pharmaceutically acceptable salt thereof, wherein
X is selected from

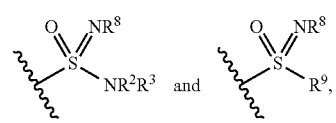

or X is a group

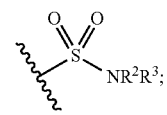

$R^1$ is selected from $C_{1-4}$-alkyl and fluoro-$C_{1-4}$-alkyl, said $C_{1-4}$-alkyl having one or more hydrogen atoms optionally replaced by deuterium;
$R^2$ is selected from H, —CN, fluoro-$C_{1-4}$-alkyl and $C_{1-4}$-acyl, said $C_{1-4}$-alkyl or $C_{1-4}$-acyl having one or more hydrogen atoms optionally replaced by deuterium;
$R^3$ is selected from H and $C_{1-4}$-alkyl and fluoro-$C_{1-4}$-alkyl, said $C_{1-4}$-alkyl having one or more hydrogen atoms optionally replaced by deuterium;
$R^4$ is selected from H and $C_{1-6}$-alkyl, said $C_{1-6}$-alkyl having one or more hydrogen atoms optionally replaced by deuterium;
$R^5$ and $R^6$ are independently selected from H, D (deuterium) and $C_{1-4}$-alkyl, said $C_{1-4}$-alkyl having one or more hydrogen atoms optionally replaced by deuterium;
$R^8$ is selected from H, —CN, —NO$_2$, $C_{1-4}$-alkyl, said $C_{1-4}$-alkyl having one or more hydrogen atoms optionally replaced by deuterium;
$R^9$ is selected from $C_{1-4}$-alkyl, fluoro-$C_{1-4}$-alkyl, $C_{3-4}$-cycloalkyl and fluoro-$C_{3-4}$-cycloalkyl, said $C_{1-4}$-alkyl or $C_{3-4}$-cycloalkyl having one or more hydrogen atoms optionally replaced by deuterium;
Y is a group

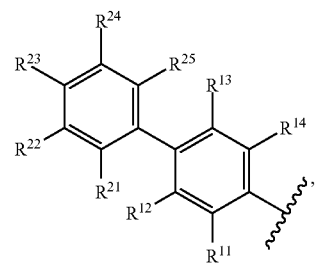

wherein

R$^{11}$, R$^{12}$, R$^{13}$ and R$^{14}$ are independently selected from H, D, halogen, CN, C$_{1-4}$-alkyl and fluoro-C$_{1-4}$-alkyl, said C$_{1-4}$-alkyl having one or more hydrogen atoms optionally replaced by deuterium;

R$^{21}$, R$^{22}$, R$^{23}$, R$^{24}$ and R$^{25}$ are independently selected from H, D, halogen, CN, C$_{1-4}$-alkyl, O—C$_{1-4}$-alkyl, fluoro-C$_{1-4}$-alkyl and O-fluoro-C$_{1-4}$-alkyl, said C$_{1-4}$-alkyl having one or more hydrogen atoms optionally replaced by deuterium;

provided that at least one hydrogen in R$^1$, R$^2$, R$^3$, R$^4$, R$^5$, R$^6$, R$^8$, R$^9$, R$^{11}$, R$^{12}$, R$^{13}$, R$^{14}$, R$^{21}$, R$^{22}$, R$^{23}$, R$^{24}$ or R$^{25}$ is replaced by deuterium.

2. The compound according to claim 1, wherein

R$^1$ is selected from CH$_3$ and CD$_3$;

R$^4$ is CH$_3$;

R$^2$, R$^3$, R$^5$, R$^6$ and R$^8$ are H; and,

R$^9$ is selected from methyl and cyclopropyl.

3. The compound according to claim 1, wherein Y is selected from

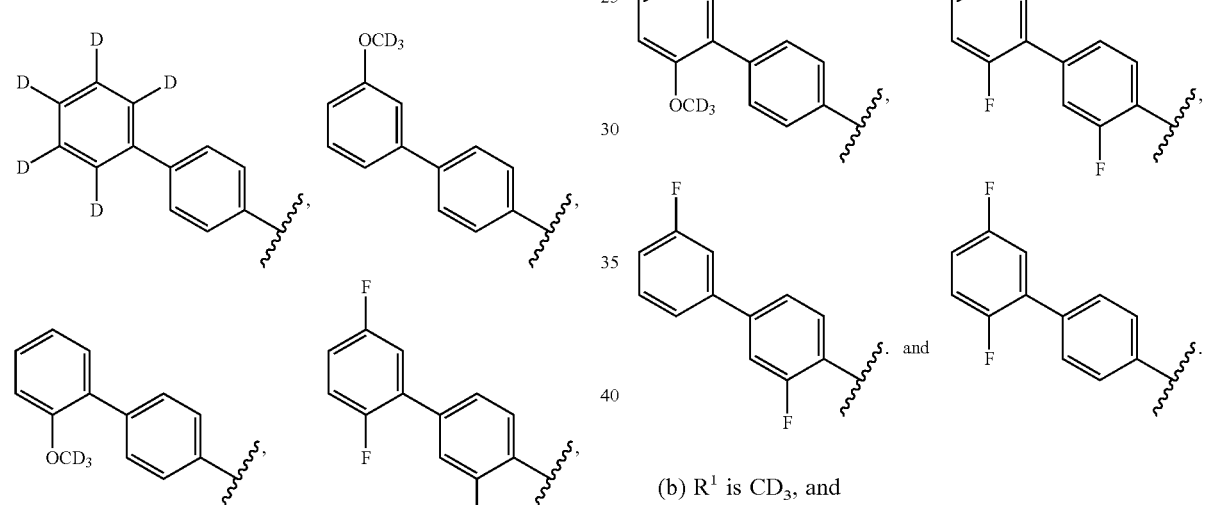

and

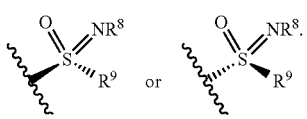

4. The compound of claim 1, wherein R$^1$ is CD$_3$.

5. The compound of claim 1, wherein X is

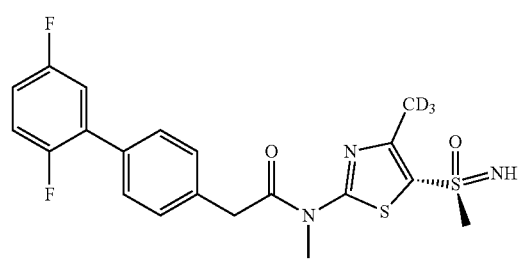

6. The compound of claim 1, wherein X is

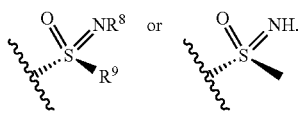

7. The compound of claim 1, wherein
(a) Y is selected from

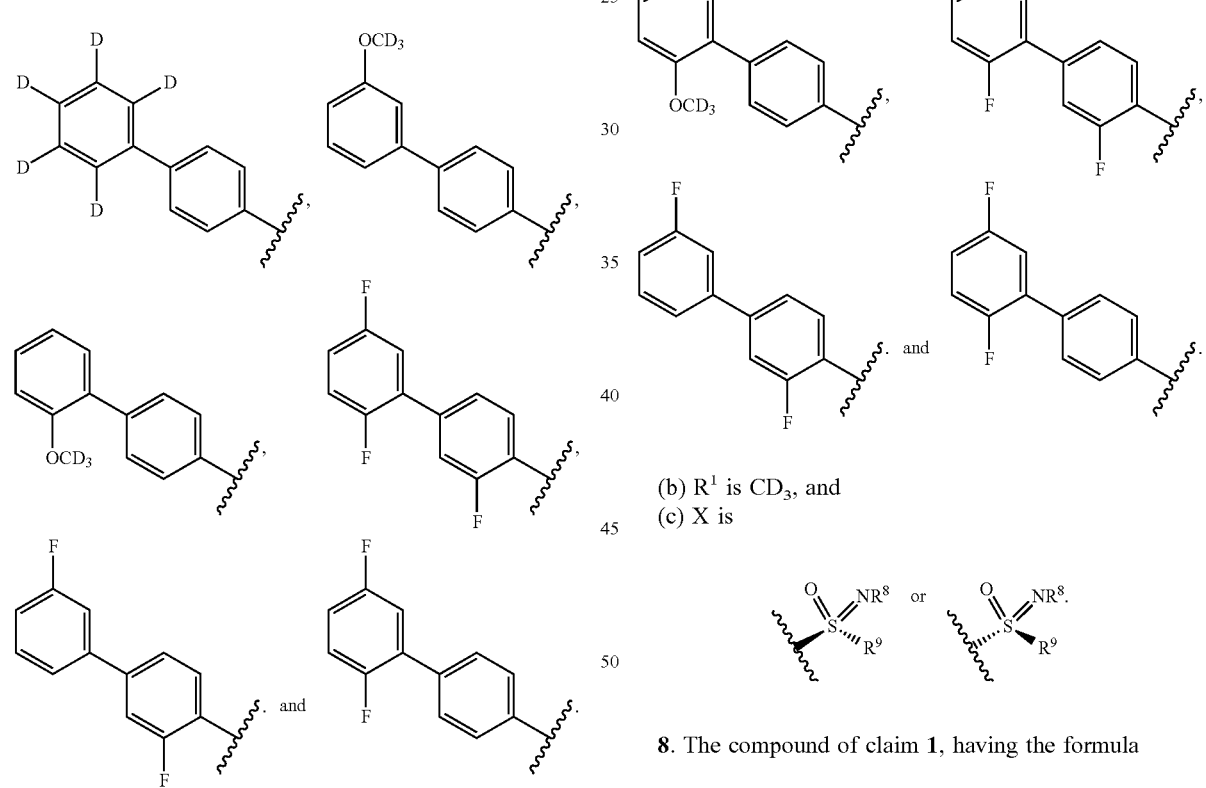

(b) R$^1$ is CD$_3$, and
(c) X is

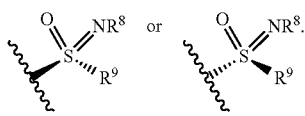

8. The compound of claim 1, having the formula

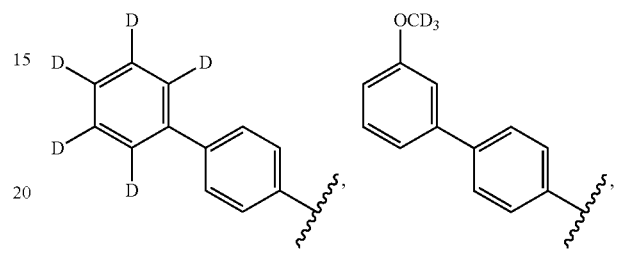

or a solvate or pharmaceutically acceptable salt thereof.

9. The compound of claim 1, wherein X is

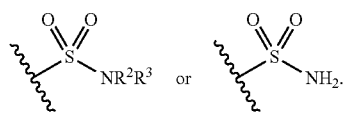

10. The compound of claim 4, wherein X is

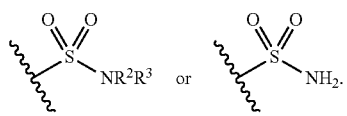

11. The compound according to claim 10, selected from the group consisting of

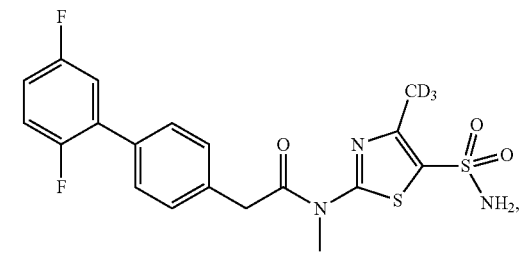

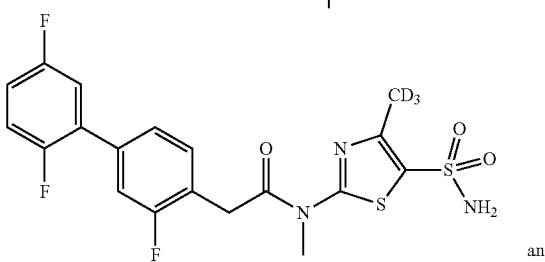

and

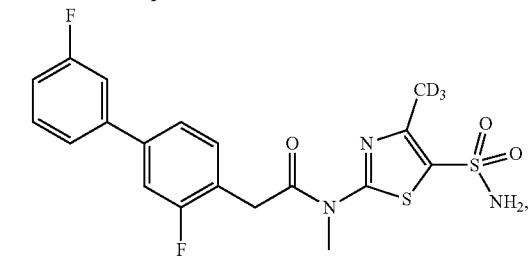

or a solvate or pharmaceutically acceptable salt thereof.

12. A medicament comprising the compound according to claim 1.

13. A medicament comprising the compound according to claim 11.

14. A method of treatment or prophylaxis of a disease or disorder associated with at least one viral infection, the method comprising, administering to a patient in need, the compound of claim 1.

15. The method of claim 14, wherein the at least one viral infection is caused by at least one herpes virus.

16. The method of claim 14, wherein the disease or disorder is at least one neurodegenerative disease caused by at least one herpes virus.

17. The method of claim 14, wherein the disease or disorder is Alzheimers disease.

18. A method of treatment or prophylaxis in patients resistant to nucleosidic antiviral therapy, and exhibiting symptoms of at least one of (a) herpes infections, (b) Alzheimers disease, (c) encephalitis, (d) pneumonia, (e) hepatitis; (f) a suppressed immune system, (g) AIDS, (h) cancer, and (j) genetic immunodeficiency, the method comprising administering to a patient in need, the medicament of claim 12.

19. A pharmaceutical composition comprising at least one compound according to claim 1 and at least one pharmaceutically acceptable carrier and/or excipient and/or at least one further active substance being effective in treating a disease or disorder associated with viral infections.

20. A pharmaceutical composition comprising at least one compound according to claim 11 and at least one pharmaceutically acceptable carrier and/or excipient and/or at least one further active substance being effective in treating a disease or disorder associated with viral infections.

21. The method of claim 18, wherein the herpes infections are selected from the group consisting of (i) Herpes simplex infections, (ii) Herpes labialis, (iii) Herpes genitalis, and (iv) Herpes-related keratitis.

22. The method of claim 18, wherein the patients are selected from the group consisting of transplant patients, new-born children, and infants.

23. The method of claim 18, wherein the method is for suppressing recurrence (suppression therapy) in Herpes-positive patients or Herpes-simplex-positive patients.

* * * * *